US010090537B2

(12) United States Patent
Numao et al.

(10) Patent No.: US 10,090,537 B2
(45) Date of Patent: Oct. 2, 2018

(54) SEAL PLATE AND FUEL CELL STACK USING THE SAME

(71) Applicant: Nissan Motor Co., Ltd., Kanagawa (JP)

(72) Inventors: Yasuhiro Numao, Kanagawa (JP); Kazuhiro Kageyama, Kanagawa (JP); Shigetaka Uehara, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 589 days.

(21) Appl. No.: 14/384,105

(22) PCT Filed: Mar. 6, 2013

(86) PCT No.: PCT/JP2013/001389
§ 371 (c)(1),
(2) Date: Sep. 9, 2014

(87) PCT Pub. No.: WO2013/132843
PCT Pub. Date: Sep. 12, 2013

(65) Prior Publication Data
US 2015/0064590 A1    Mar. 5, 2015

(30) Foreign Application Priority Data

Mar. 9, 2012 (JP) ................................ 2012-053314
Dec. 18, 2012 (JP) ................................ 2012-275474

(51) Int. Cl.
*H01M 8/24* (2016.01)
*H01M 8/04* (2016.01)
(Continued)

(52) U.S. Cl.
CPC ......... *H01M 8/0273* (2013.01); *H01M 8/026* (2013.01); *H01M 8/0267* (2013.01);
(Continued)

(58) Field of Classification Search
CPC ......... H01M 8/04074; H01M 8/04067; H01M 8/2485
See application file for complete search history.

(56) References Cited

U.S. PATENT DOCUMENTS 7,977,011 B2    7/2011  Inagaki
2003/0203260 A1  10/2003  Lee
(Continued)

FOREIGN PATENT DOCUMENTS

CN    102306813 A    1/2012
JP    2005-190706 A   7/2005

OTHER PUBLICATIONS

International Search Report issued in PCT/JP2013/001389 dated Jul. 29, 2013 (2 pages).
(Continued)

*Primary Examiner* — Stewart A Fraser
*Assistant Examiner* — Rachel L Zhang
(74) *Attorney, Agent, or Firm* — Osha Liang LLP

(57) ABSTRACT

A fuel cell stack includes at least two cell modules adjacent to each other, the at least two cell modules each being formed by stacking a plurality of fuel cells into an integrated unit and a seal plate interposed in a cooling flow channel defined between separators of the at least two cell modules, the cooling flow channel configured to allow a cooling fluid to flow therethrough. The seal plate includes a manifold portion in which a plurality of manifold holes are formed to allow two power-generation gases to flow separately through the plurality of manifold holes and through the plurality of fuel cells and a seal member provided along a peripheral portion of each of the plurality of manifold holes to provide sealing for a corresponding one of the two power-generation gases flowing through the manifold hole.

10 Claims, 20 Drawing Sheets

(51) Int. Cl.
*H01M 8/0273* (2016.01)
*H01M 8/2483* (2016.01)
*H01M 8/026* (2016.01)
*H01M 8/0267* (2016.01)
*H01M 8/0276* (2016.01)
*H01M 8/04007* (2016.01)
*H01M 8/028* (2016.01)

(52) U.S. Cl.
CPC ..... *H01M 8/0276* (2013.01); *H01M 8/04074* (2013.01); *H01M 8/2483* (2016.02); *H01M 8/028* (2013.01)

(56) References Cited

U.S. PATENT DOCUMENTS

| | | | |
|---|---|---|---|
| 2009/0042086 A1 | 2/2009 | Ishikawa et al. | |
| 2010/0261079 A1* | 10/2010 | Kells | H01M 8/04037 429/429 |
| 2011/0165492 A1* | 7/2011 | Wagner | H01M 8/04089 429/457 |
| 2015/0050577 A1* | 2/2015 | Numao | H01M 8/2485 429/460 |

OTHER PUBLICATIONS

Written Opinion of the International Searching Authority issued in PCT/JP2013/001389 dated Jul. 29, 2013 (5 pages).
International Preliminary Report on Patentability from PCT/JP2013/001389 dated May 16, 2014 (11 pages).

* cited by examiner

[Fig. 1]
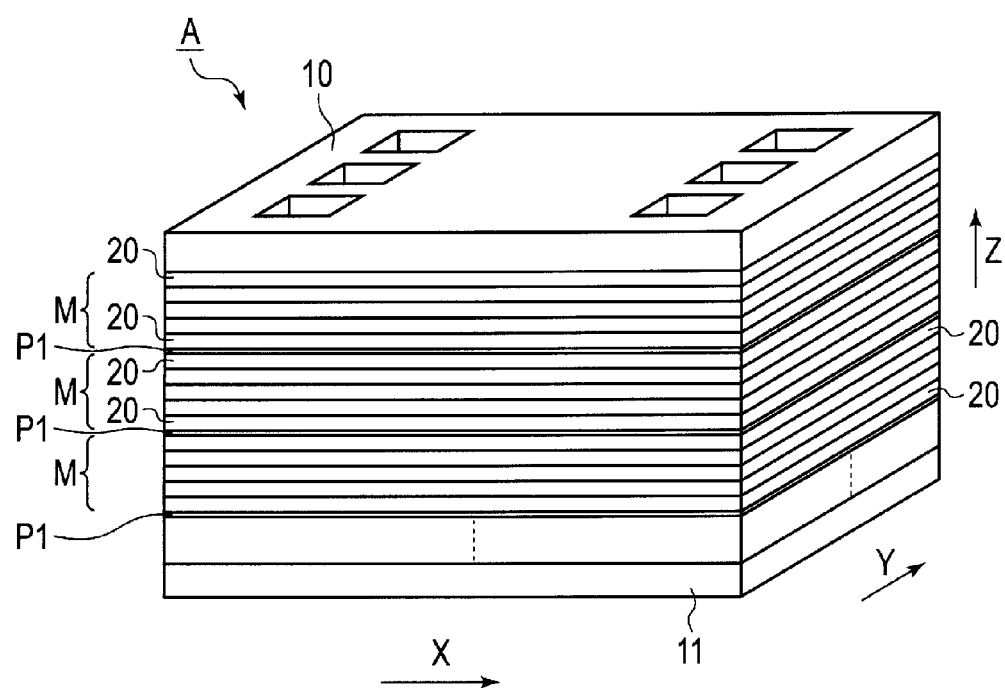

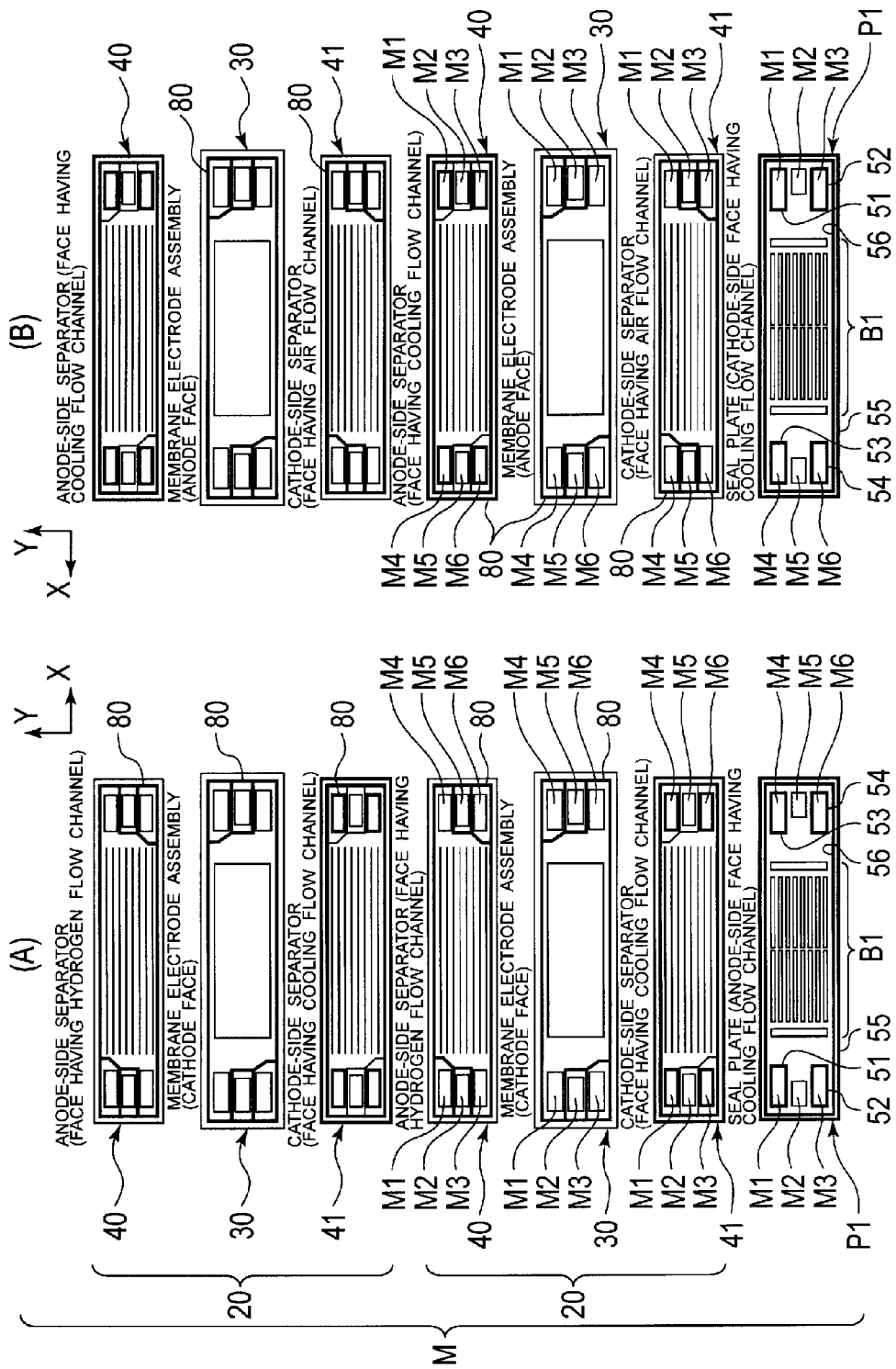
[Fig. 2]

[Fig. 3]
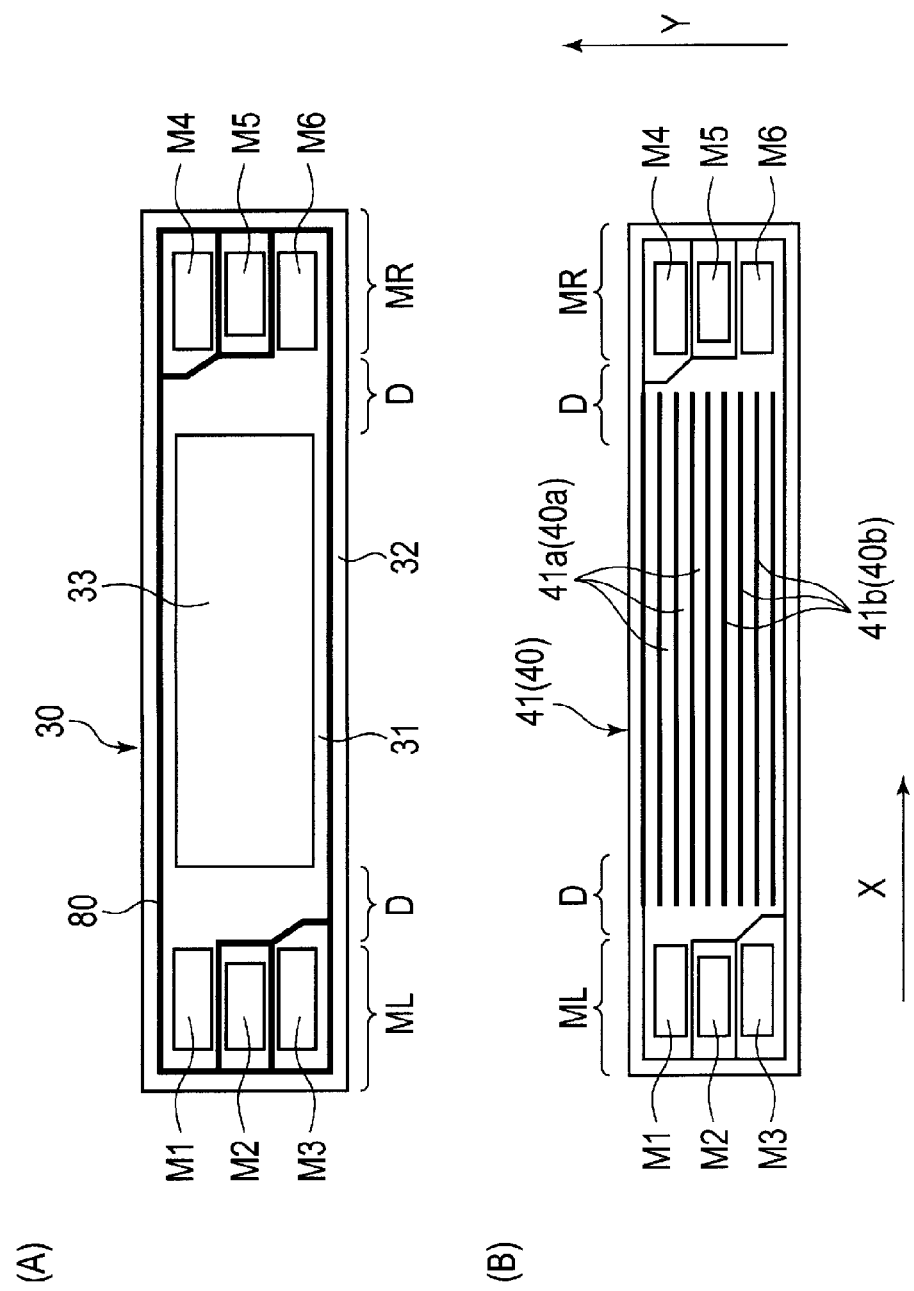

[Fig. 4]
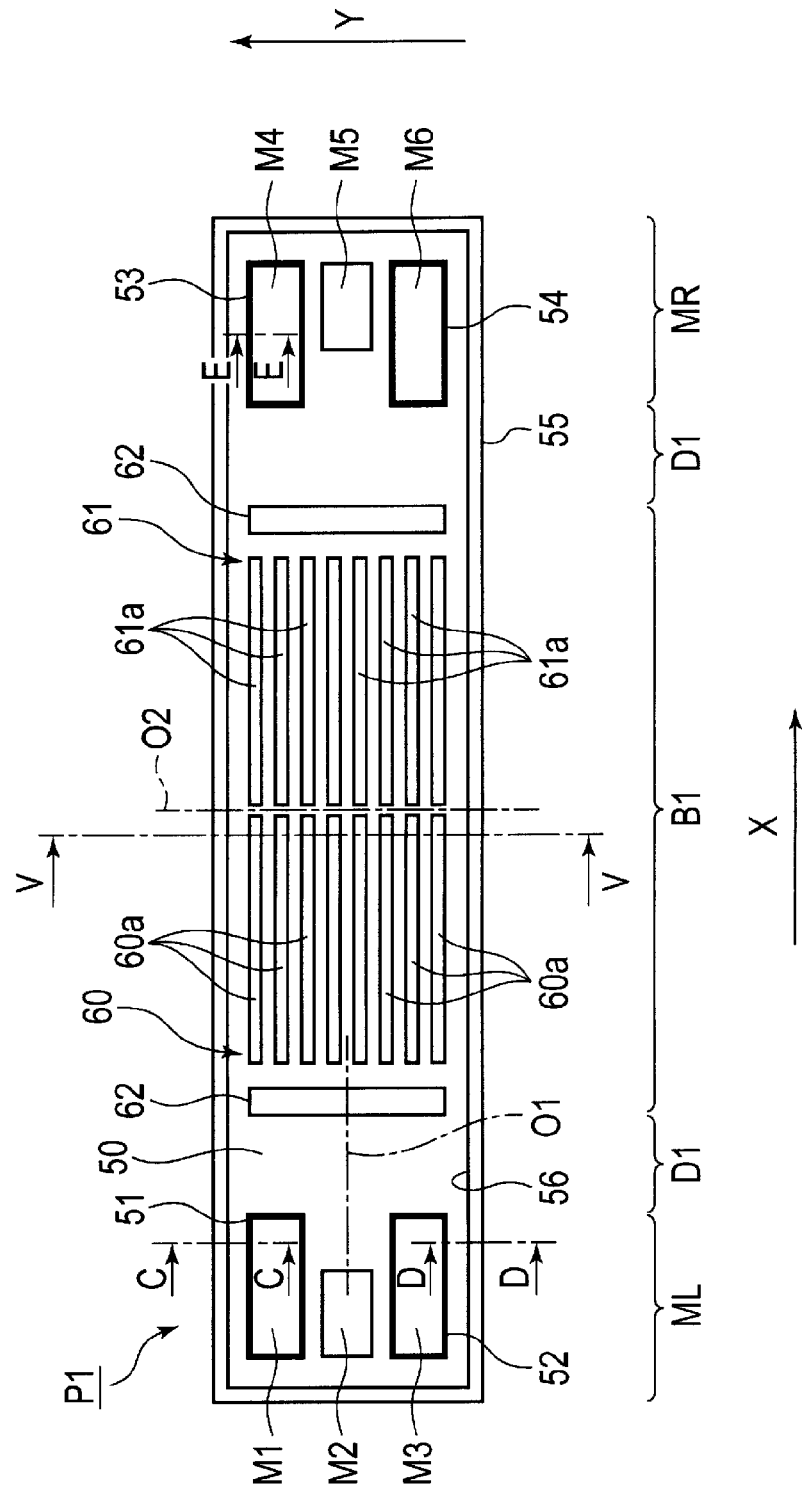

[Fig. 5]
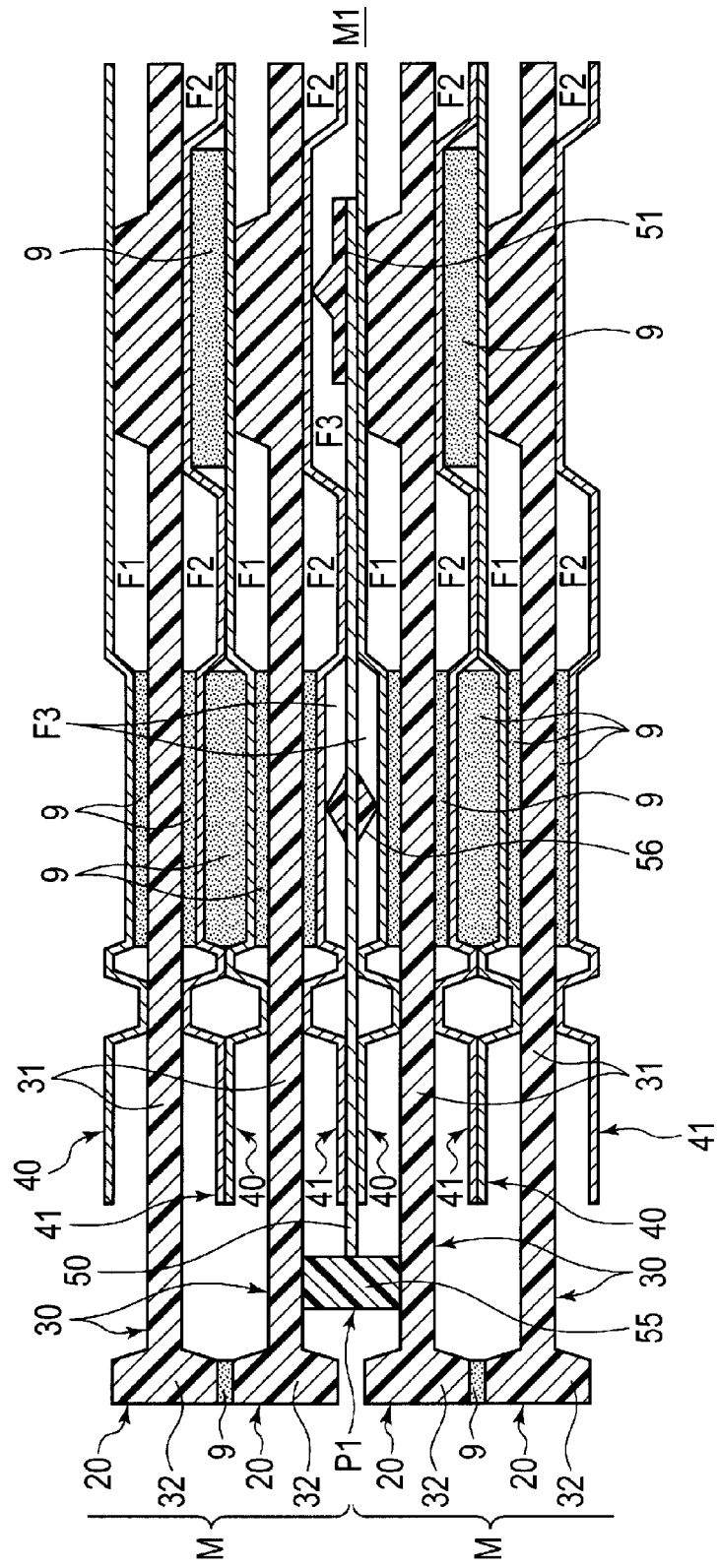

[Fig. 6]
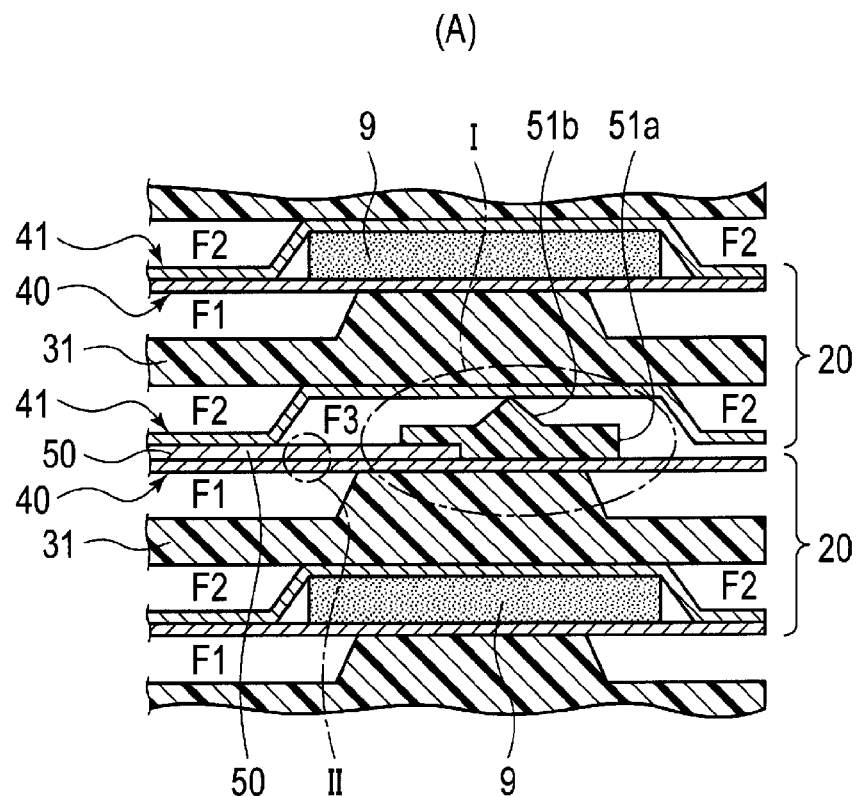
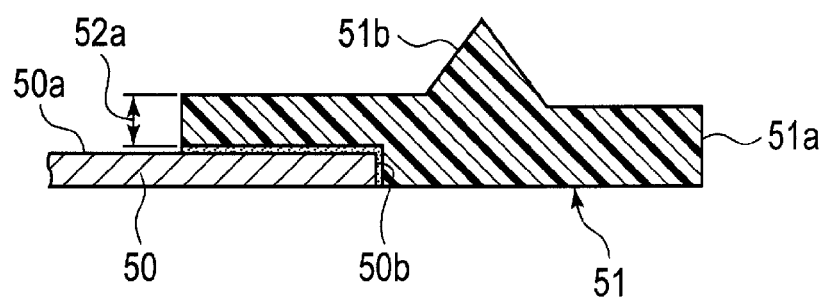

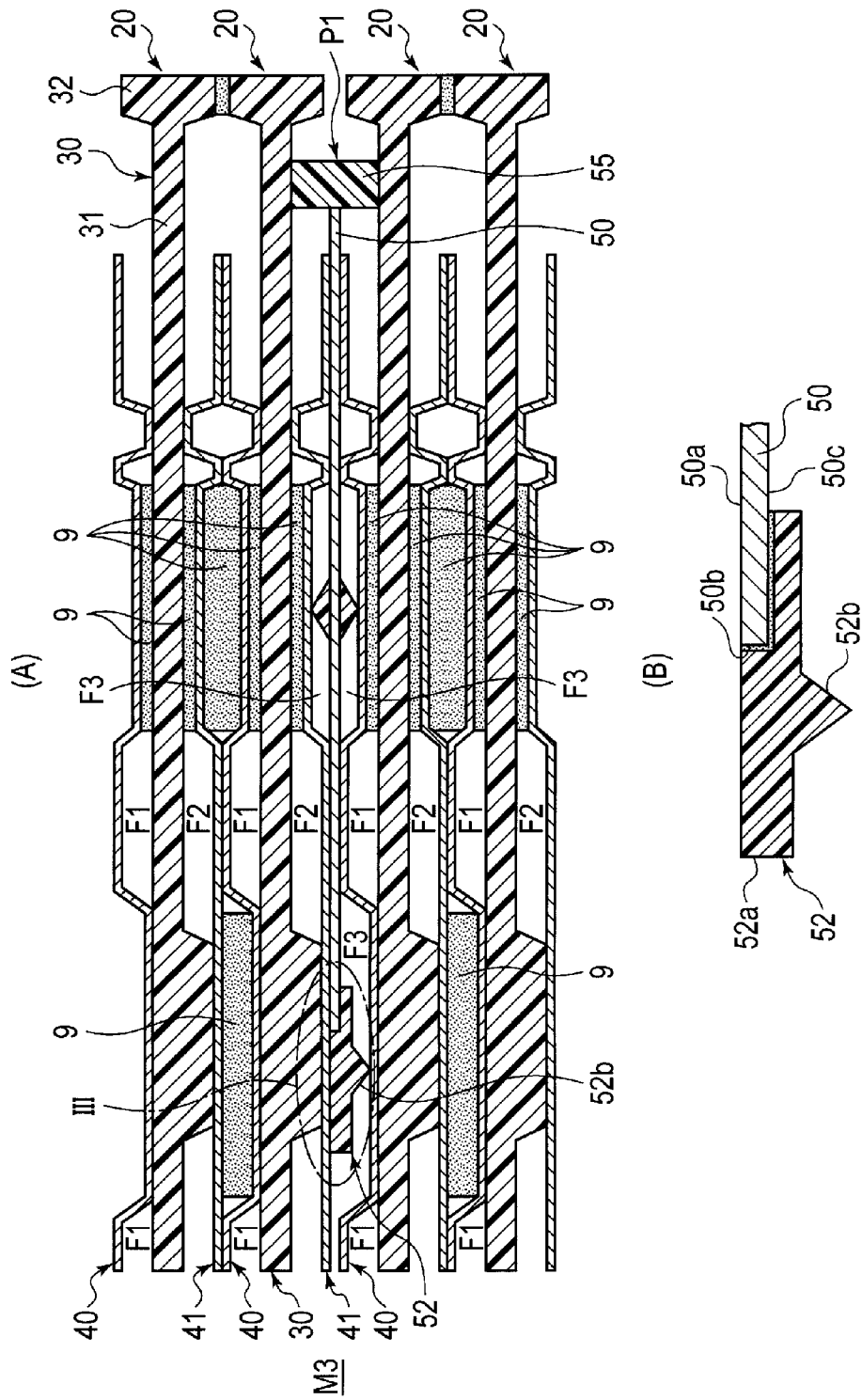
[Fig. 7]

[Fig. 8]
(A)
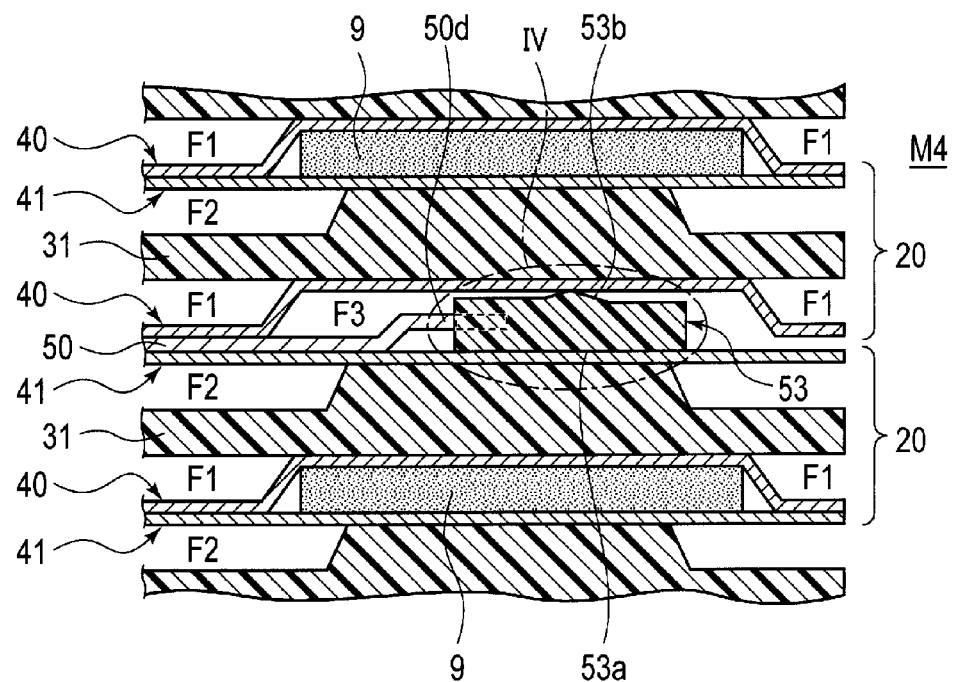
(B)
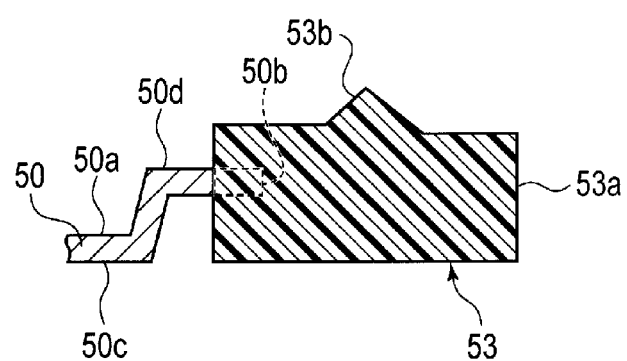

[Fig. 9]
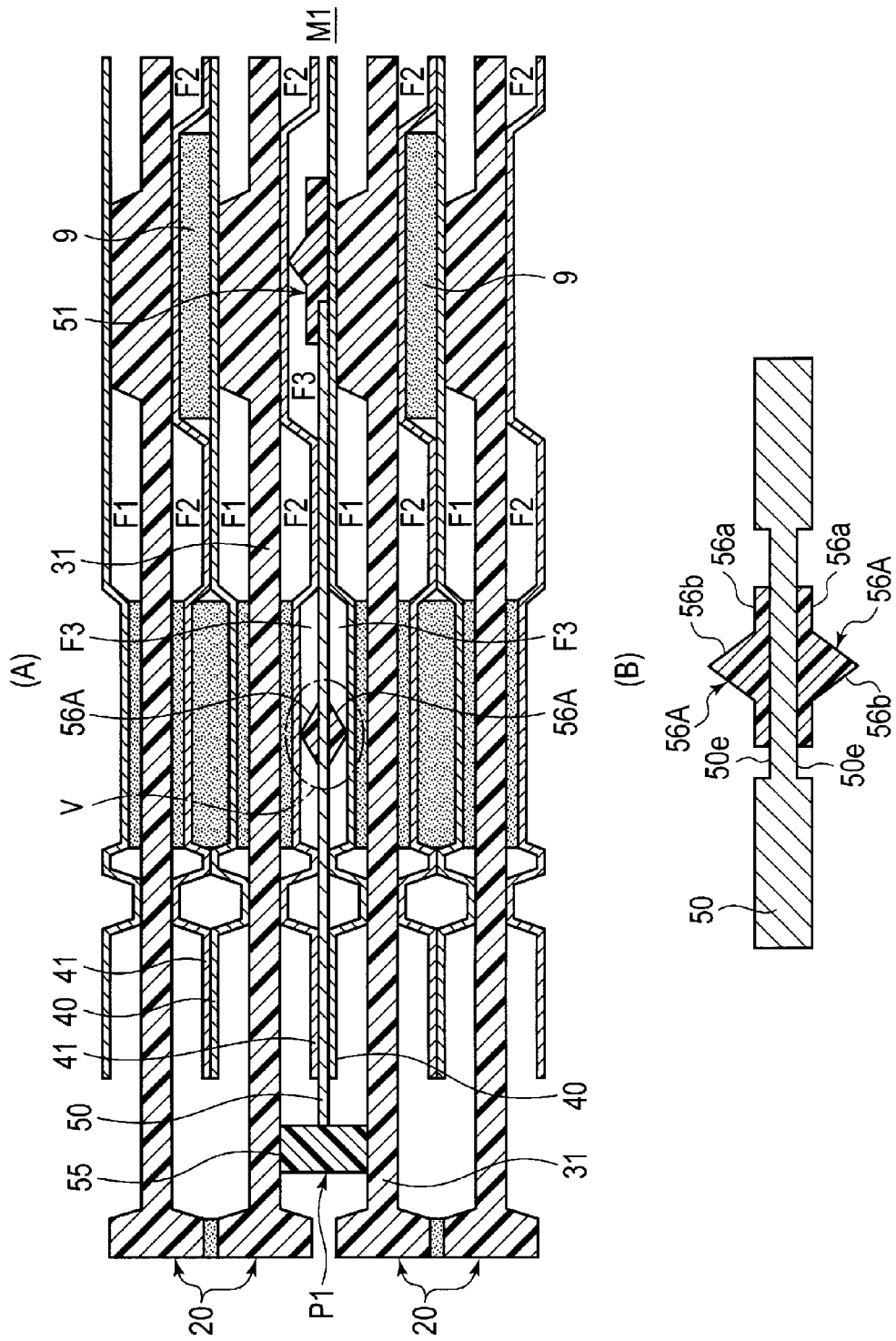

[Fig. 10]
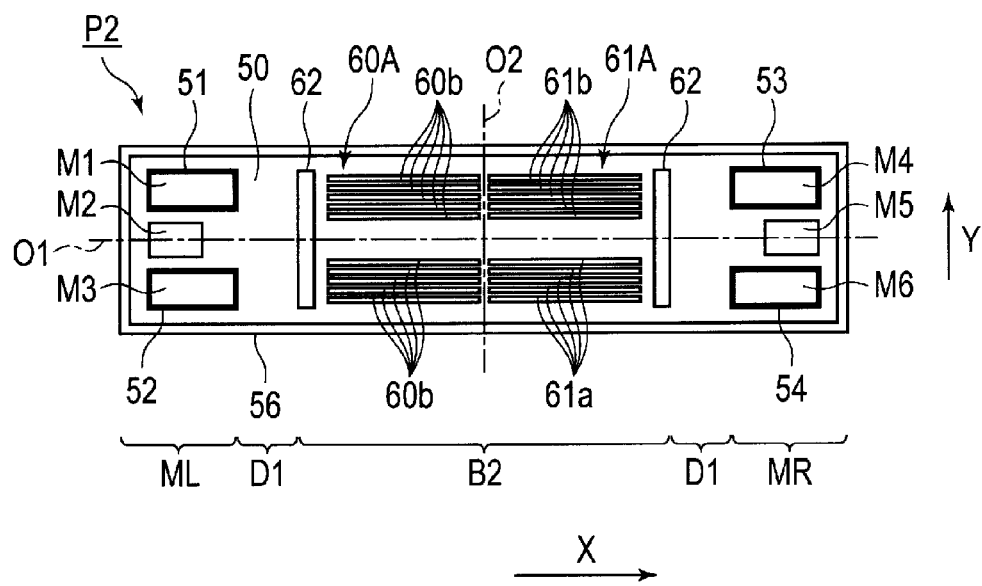
[Fig. 11]
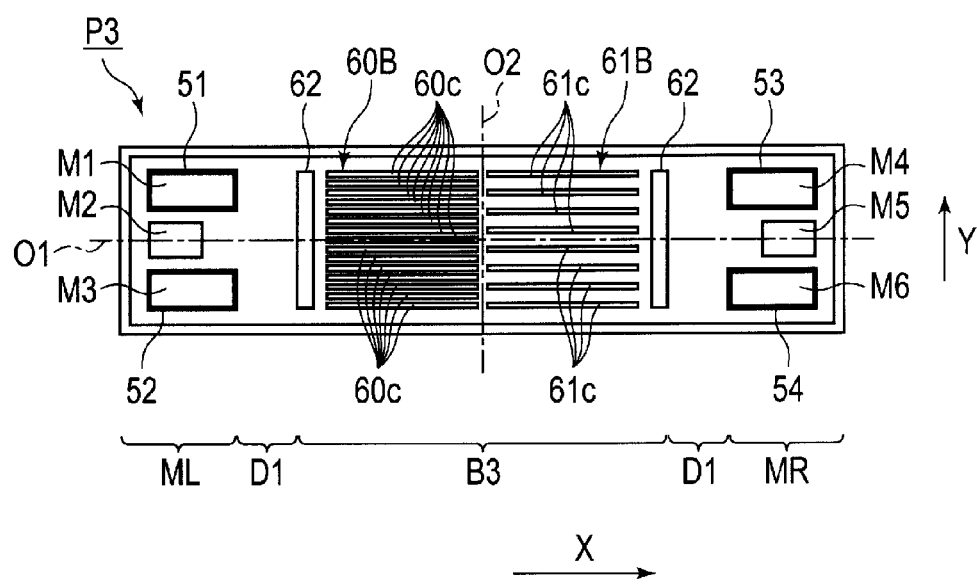

[Fig. 12]
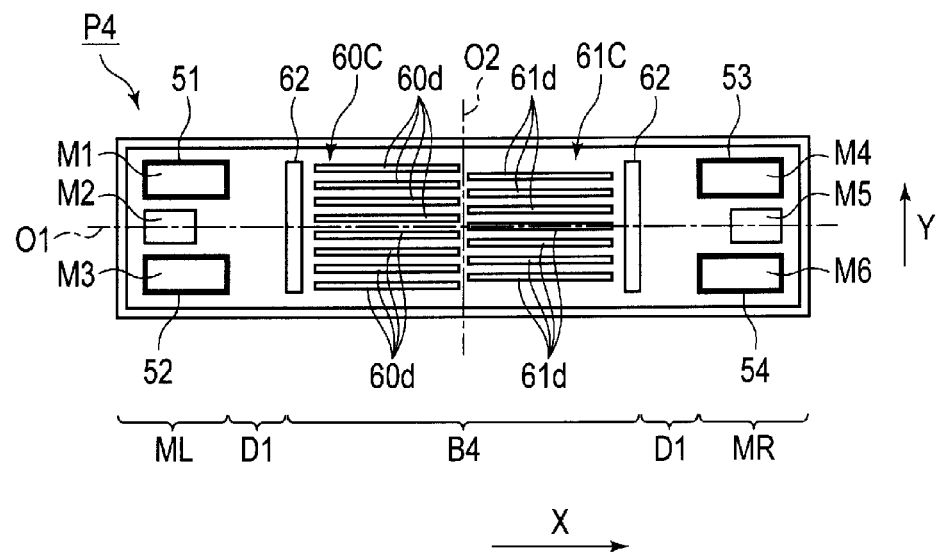
[Fig. 13]
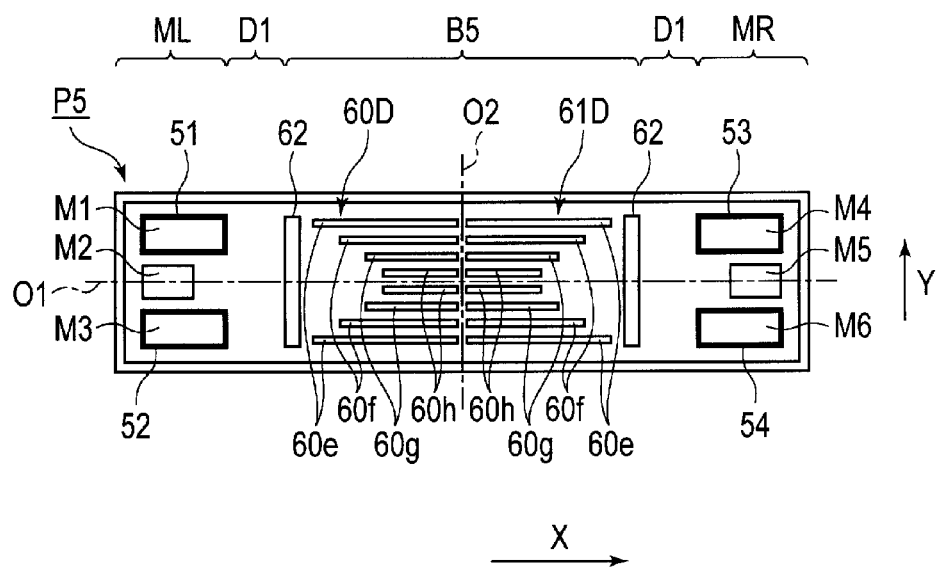

[Fig. 14]
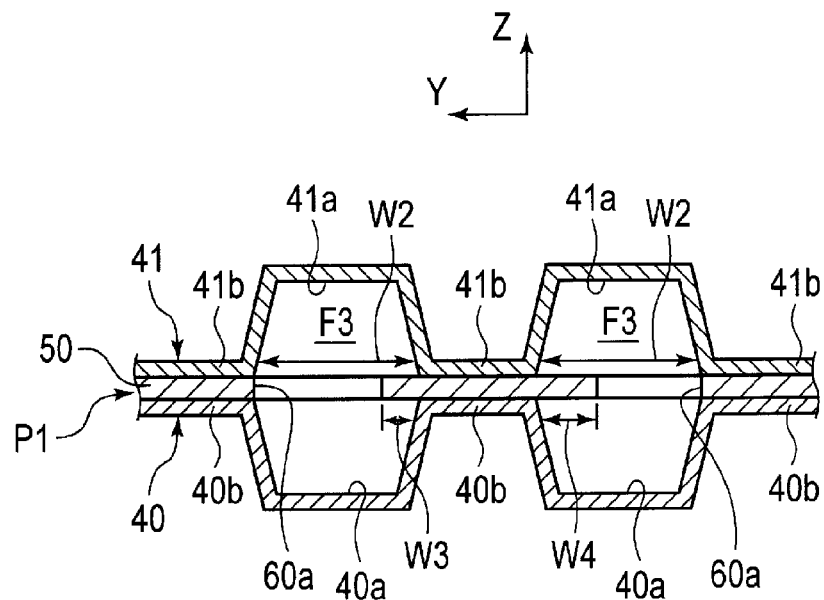
[Fig. 15]
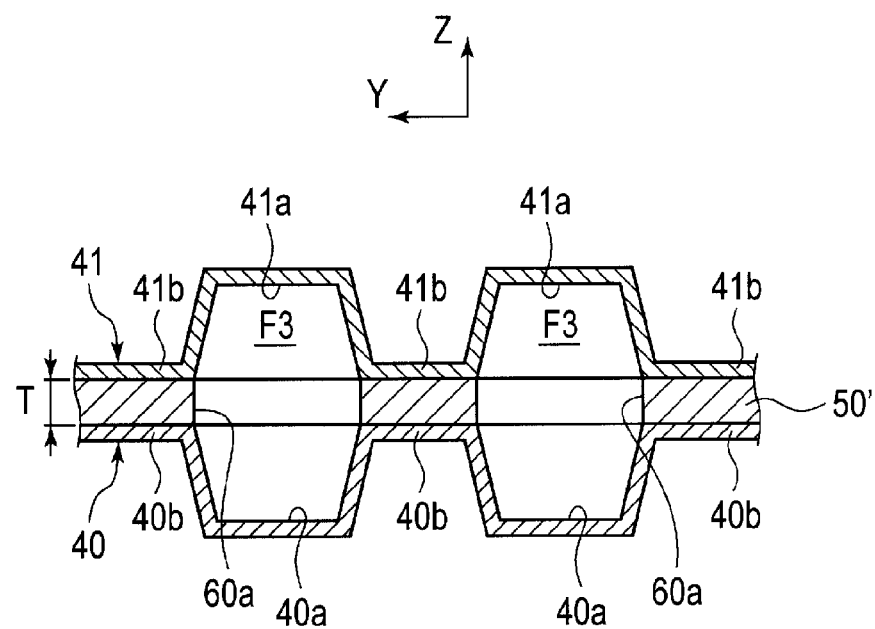

[Fig. 16]
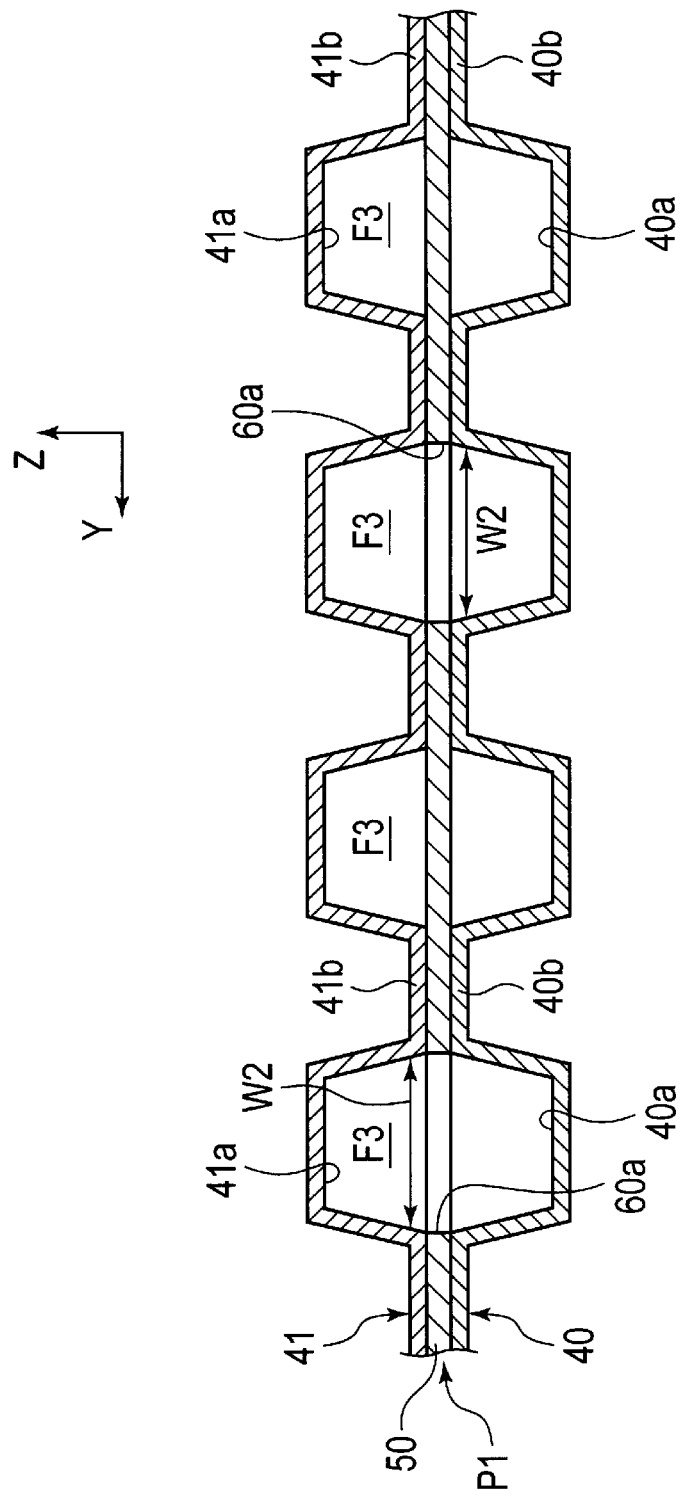

[Fig. 17]
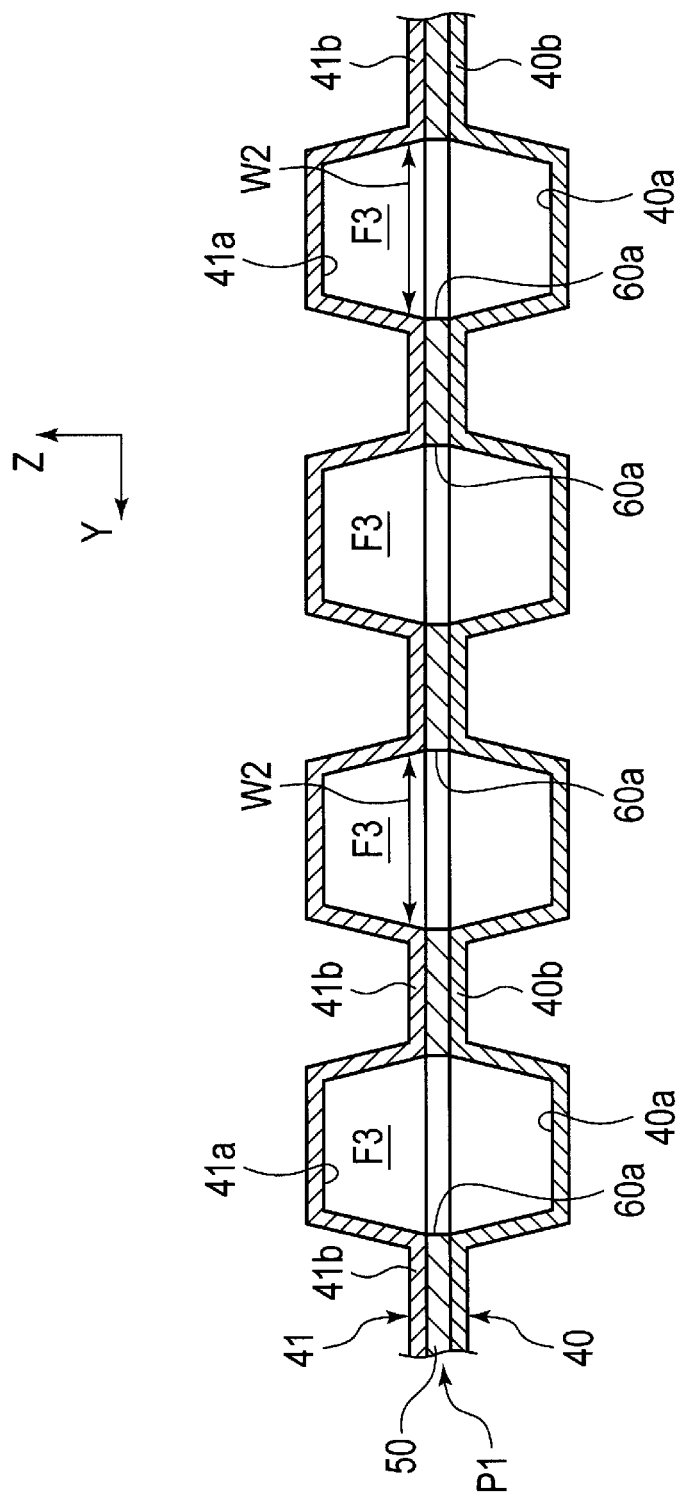

[Fig. 18]
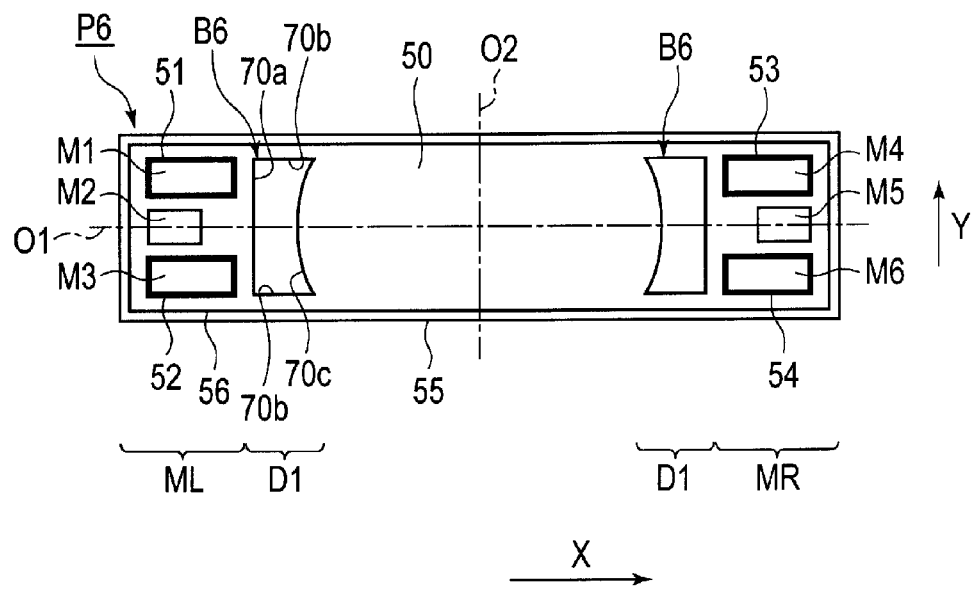
[Fig. 19]
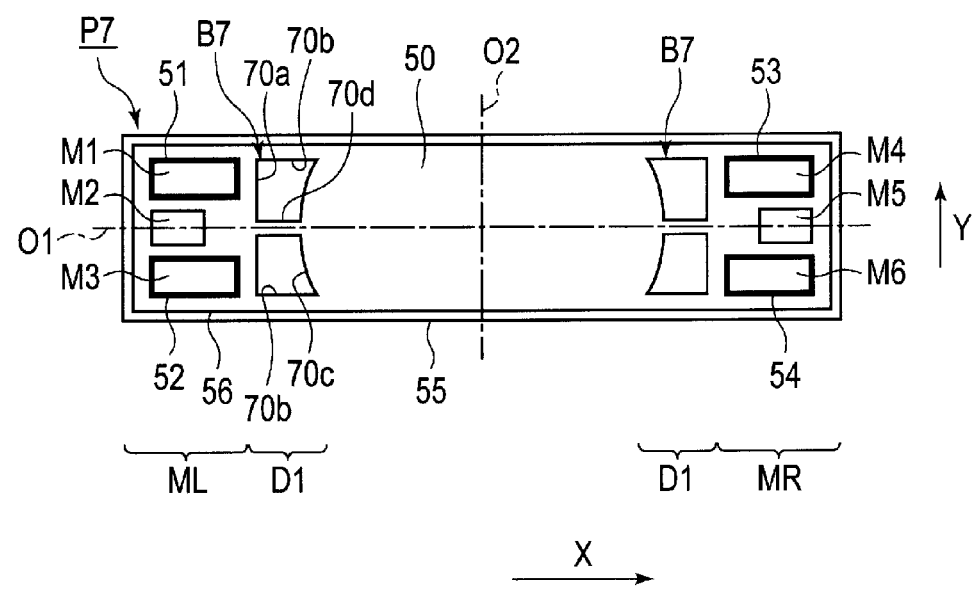

[Fig. 20]
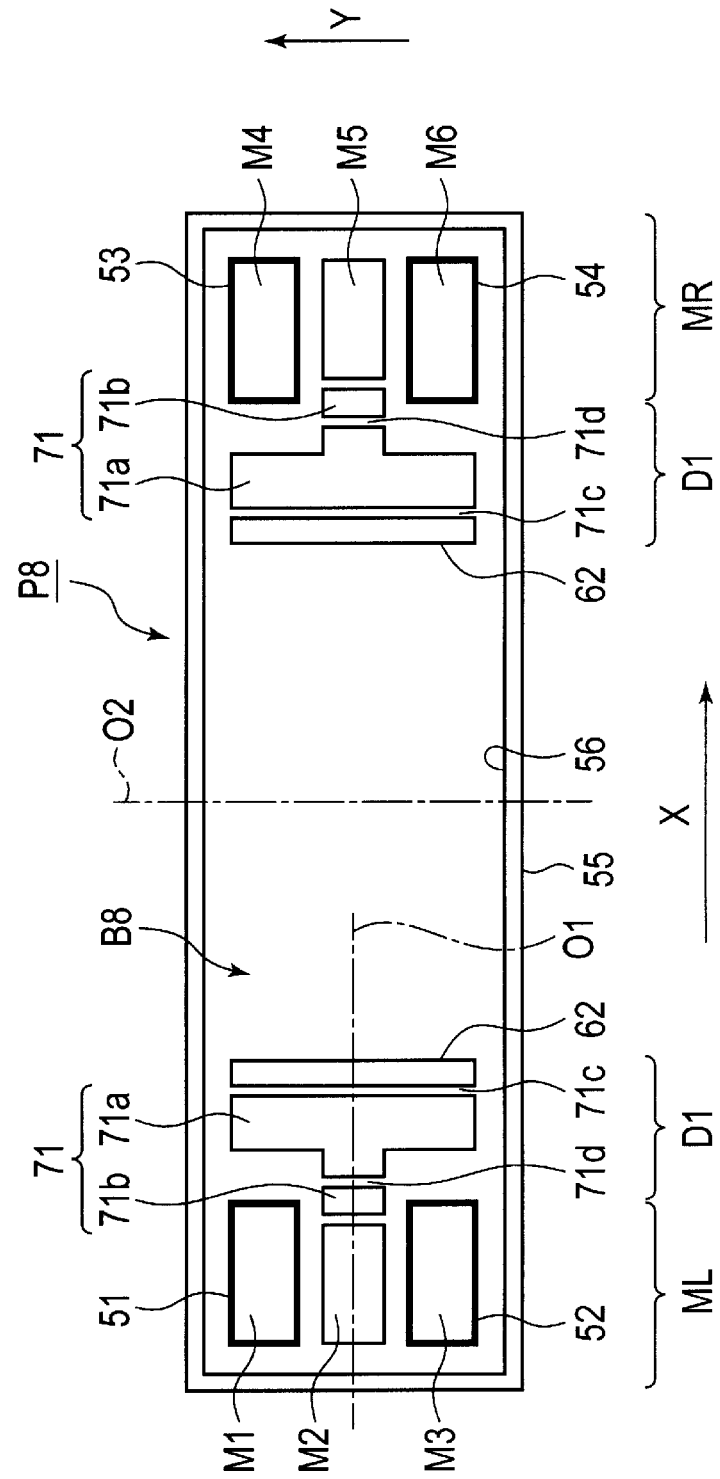

[Fig. 21]
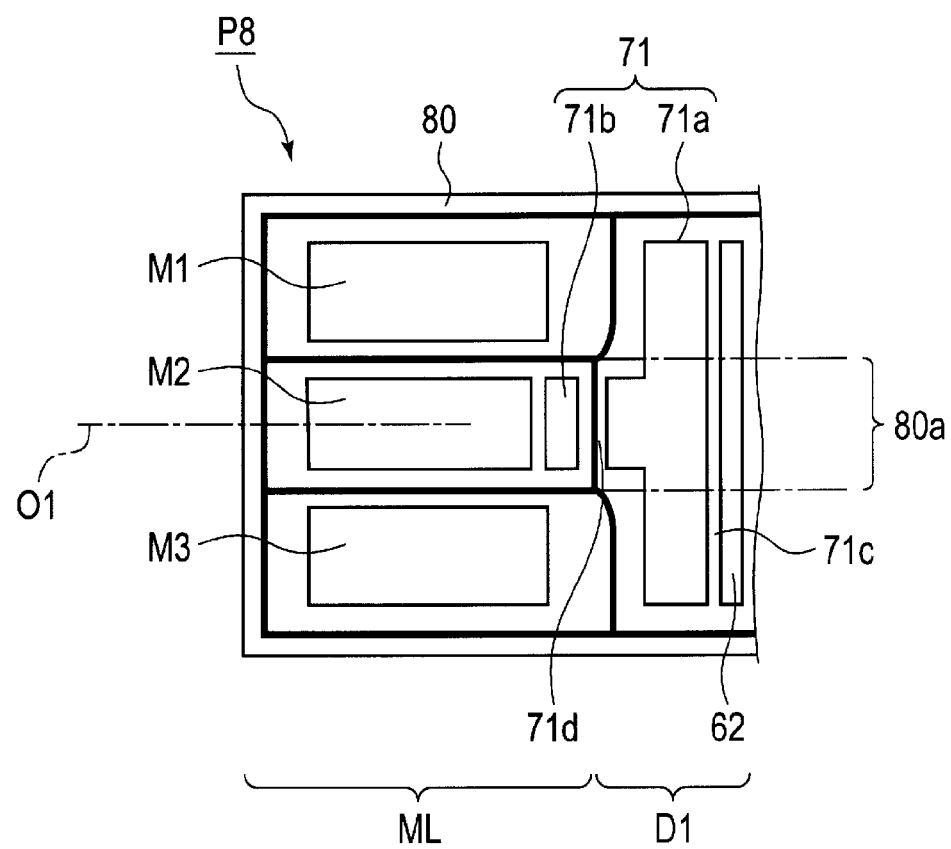

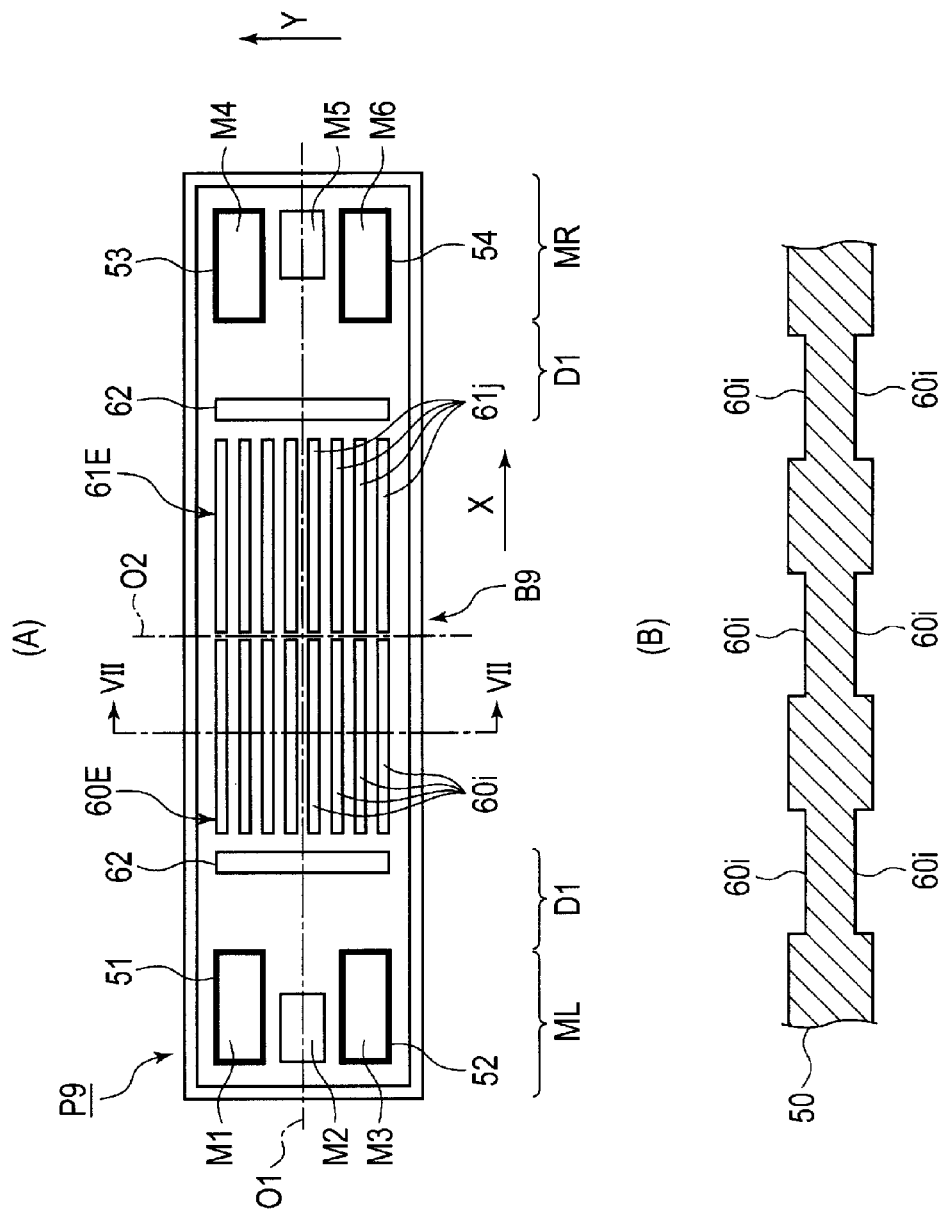
[Fig. 22]

[Fig. 23]
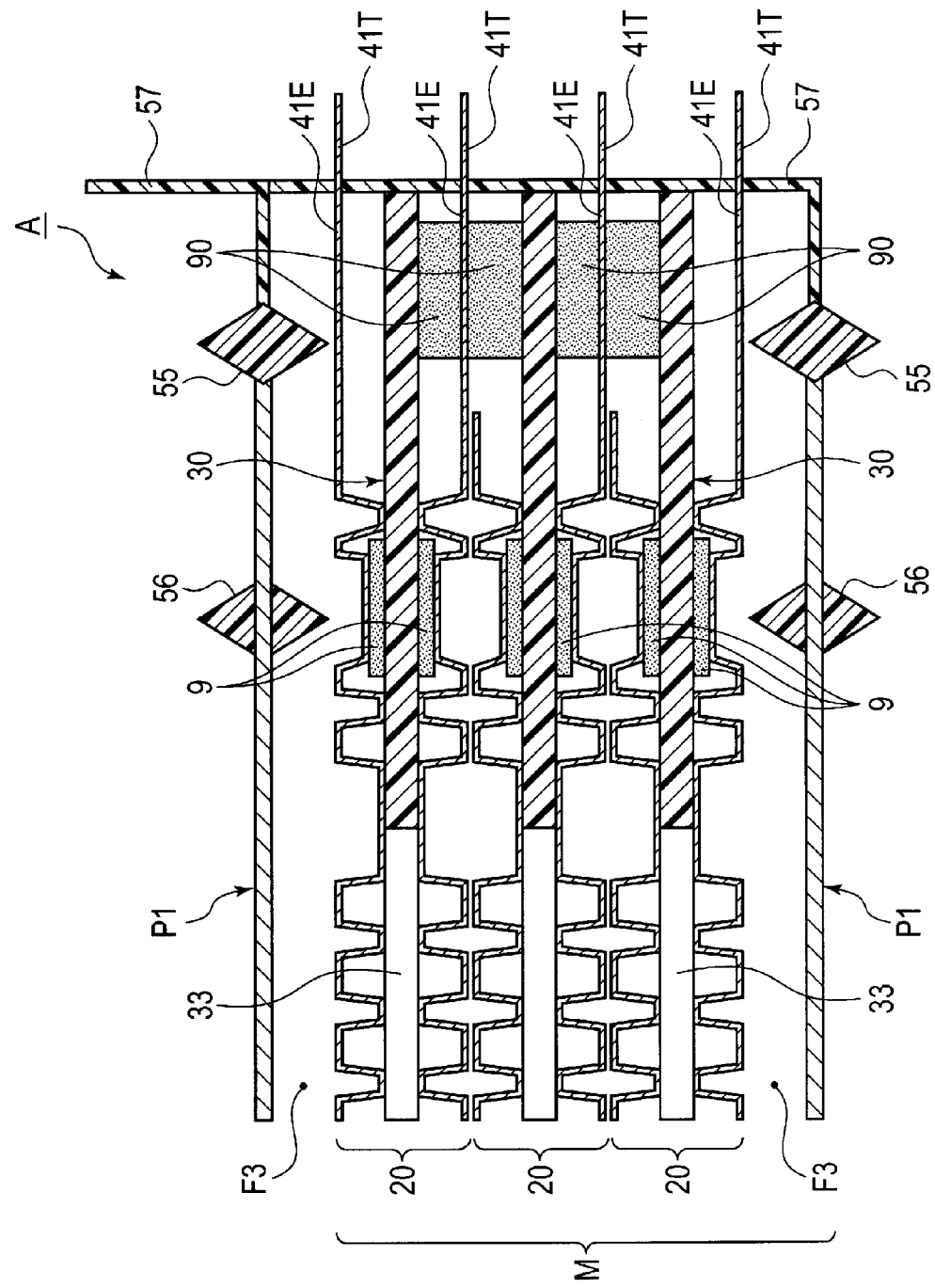

[Fig. 24]
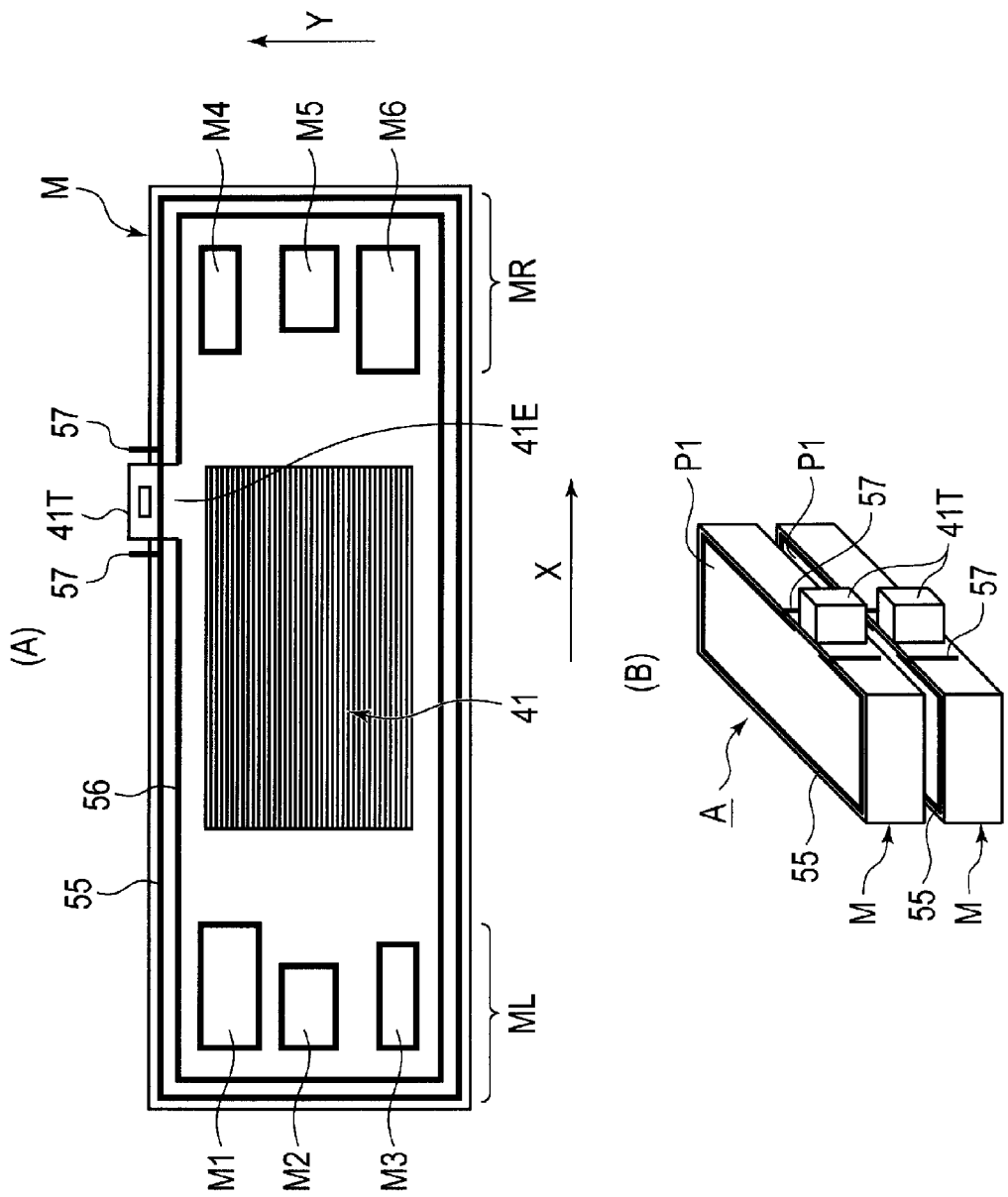

SEAL PLATE AND FUEL CELL STACK USING THE SAME

CROSS-REFERENCE TO RELATED APPLICATIONS

This application is a National Stage application of International Patent Application No. PCT/JP2013/001389, filed on Mar. 6, 2013, which claims priority to Japanese Patent Application No. 2012-053314, filed on Mar. 9, 2012, and Japanese Patent Application No. 2012-275474, filed Dec. 18, 2012. Japanese Patent Application Nos. 2012-053314 and 2012-275474 as well as International Patent Application No. PCT/JP2013/001389 are hereby incorporated by reference in their entirety.

TECHNICAL FIELD

The present invention relates to a seal plate applied to a fuel cell stack and also relates to a fuel cell stack using the seal plate.

BACKGROUND ART

Japanese Patent Application Laid-Open Publication No. 2005-190706 discloses a fuel cell stack structure in which multi-cell modules each formed by stacking multiple fuel cells are arranged in a row in a cell-stacking direction, and a space between adjacent ones of the cell modules is sealed with a bead gasket. A separator of each end cell of a multi-cell module to be in contact with the bead gasket is given larger surface rigidity than the separators of center cells of the multi-cell module. Specifically, in order for the separator of the end cell of the multi-cell module to have the larger surface rigidity than those of the center cells, a flat panel is superimposed on the separator of the end cell.

SUMMARY OF INVENTION

Technical Problem

Since the fuel cell stack described above has the flat plate in cooling-medium flow channels between the multi-cell modules, the flat plate increases the pressure drop of the cooling water. This has been a problem to be solved.

The present invention has an objective to provide a seal plate capable of reducing or adjusting a pressure drop in cooling flow channels and a fuel cell stack using the seal plate.

Solution to Problem

An aspect of the present invention is a seal plate configured to be interposed in a cooling flow channel defined between adjacent ones of at least two cell modules, the cooling flow channel configured to allow a cooling fluid to flow therethrough, the cell modules each being formed by stacking a plurality of fuel cells into an integrated unit. The seal plate includes: a manifold portion, seal members, and a pressure-drop adjustment portion. In the manifold portion, multiple manifold holes are formed from which two kinds of power-generation gases flow separately in and out to flow through the plurality of fuel cells. The seal members are each provided along a peripheral portion of each of the manifold holes to provide sealing for a corresponding one of the power-generation gases flowing through the manifold hole. The pressure-drop adjustment portion reduces or adjusts a pressure drop of the cooling fluid flowing through the cooling flow channel.

Another aspect of the present invention is a fuel cell stack in which the above seal plate is interposed between adjacent cell modules.

BRIEF DESCRIPTION OF DRAWINGS

FIG. 1 is a perspective external view schematically showing a fuel cell stack according to a first embodiment of the present invention.

FIG. 2 illustrates arrangement of separators, membrane electrode assemblies, and a seal plate which constitute a cell module, FIG. 2(A) being plan views each showing one of their faces, FIG. 2(B) being plan views each showing the other one of their faces.

FIG. 3 shows the membrane electrode assembly and the cathode-side separator, FIG. 3(A) being an enlarged plan view of the membrane electrode assembly shown in FIG. 2(A), FIG. 3(B) being an enlarged plan view of the cathode-side separator shown in FIG. 2(A).

FIG. 4 is an enlarged plan view of the seal plate shown in FIGS. 2(A) and 2(B).

FIG. 5 is a partially-enlarged sectional view, taken along line C-C in FIG. 4, of the fuel cell stack in FIG. 1.

FIG. 6 shows in detail a seal member according to another example provided on the peripheral portion of a manifold hole, FIG. 6(A) being an enlarged view of a part around the seal member, FIG. 6(B) being an enlarged view of a part indicated by encircling line I in FIG. 6(A).

FIG. 7 is a partially-enlarged sectional view of the fuel cell stack, FIG. 7(A) being partially-enlarged sectional view, taken along line D-D in FIG. 4, of the fuel cell stack, and FIG. 7(B) being an enlarged view of a part indicated by encircling line III in FIG. 7(A).

FIG. 8 shows in detail a seal member according to another example provided on the peripheral portion of a manifold hole, FIG. 8(A) being an enlarged sectional view, taken along line E-E in FIG. 4, of a part around the seal member, FIG. 8(B) being an enlarged view of a part indicated by encircling line IV in FIG. 8(A).

FIG. 9 shows in detail a seal member according to another example provided on the peripheral portion of a manifold hole, FIG. 9(A) being an enlarged sectional view, taken along line C-C in FIG. 4, of a part around the seal member, FIG. 9(B) being an enlarged view of a part indicated by encircling line IV in FIG. 9(A).

FIG. 10 is a plan view of a seal plate according to a second embodiment of the present invention.

FIG. 11 is a plan view of a seal plate according to a third embodiment of the present invention.

FIG. 12 is a plan view of a seal plate according to a fourth embodiment of the present invention.

FIG. 13 is a plan view of a seal plate according to a fifth embodiment of the present invention.

FIG. 14 is a partially-enlarged sectional view taken along line V-V in FIG. 4, showing a positional relation between the seal plate and the separators.

FIG. 15 is a partially-enlarged view of a section taken at an equivalent position to line V-V in FIG. 4, and shows an example where a plate substrate is thicker than that in FIG. 14.

FIG. 16 is a partially-enlarged view of a section taken at an equivalent position to line V-V in FIG. 4.

FIG. 17 is a partially-enlarged view of a section taken at an equivalent position to line V-V in FIG. 4.

FIG. 18 is a plan view of a seal plate according to a sixth embodiment of the present invention.

FIG. 19 is a plan view of a seal plate according to a seventh embodiment of the present invention.

FIG. 20 is a plan view of a seal plate according to an eighth embodiment of the present invention.

FIG. 21 is an enlarged plan view of an end portion of the seal plate in FIG. 20.

FIG. 22 shows a seal plate according to a ninth embodiment of the present invention, FIG. 22(A) being a plan view of the seal plate, FIG. 22(B) being a partially-enlarged view of a section taken along line VII-VII in FIG. 22(A).

FIG. 23 is a sectional view of a part of a fuel cell stack according to a tenth embodiment of the present invention.

FIG. 24 shows the fuel cell stack in FIG. 23, FIG. 24(A) being a plan view of the cell module in FIG. 23, and FIG. 24(B) being a perspective view of the fuel cell stack in FIG. 23.

DESCRIPTION OF EMBODIMENTS

Modes for carrying out the present invention are described below with reference to the drawings. Note that the same portions are given the same reference numerals throughout the drawings, and are not described repeatedly. The dimensional ratios in the drawings are exaggerated for the sake of description, and may be different from actual ones.

First Embodiment

In a fuel cell stack A according to one example shown in FIG. 1, a seal plate P1 is interposed between each adjacent ones of cell modules M, and all these cell modules M are sandwiched and pressed together by end plates 10 and 11 from both above and below in FIG. 1.

Each cell module M is formed by stacking a required number of fuel cells 20 in a stacking direction Z into an integrated unit. The outside wall faces of the cell modules M (their faces except for both end faces in the stacking direction Z) are formed by attaching flange portions 32 of cell frames 30, which are to be described later, to each other with an adhesive 9. Thereby, entrance of water into the inside of the cell modules M is prevented, and at the same time, the cell modules M are electrically insulated. In FIG. 1, as an example, five fuel cells 20 are stacked and attached to form one cell module M. The number of the fuel cells 20 is not limited to this, and also, layers of adhesive are not shown in FIG. 1.

Each fuel cell 20 has a cell frame 30 (see FIGS. 2(A) to 3(B)) and paired separators 40 and 41 provided on respective sides of the cell frame 30. The fuel cell 20 is shaped as a horizontal rectangle in front view seen in the stacking direction Z. Herein, an X direction is a direction perpendicular to the stacking direction Z and in parallel with the long side of the fuel cell 20, and a Y direction is a direction perpendicular to the X direction and the stacking direction Z and in parallel with the short side of the fuel cell 20. Gas flow channels F1 and F2 are defined between the cell frame 30 and the paired separators 40 and 41 for two different kinds of power-generation gases to flow therethrough, respectively. The two different kinds of power-generation gases are a hydrogen-containing gas and an oxygen-containing gas, and the paired separators are the anode-side separator 40 and the cathode-side separator 41.

The cell frame 30 is an insulating member made of resin. In this embodiment, the cell frame 30 has a horizontal rectangular shape in a front view seen in the stacking direction Z of the fuel cells 20. The cell frame 30 has a substrate 31 having a certain thickness and the flange portion 32 formed along the entire periphery of the substrate 31, protruding to both the front side and the rear side. A membrane electrode assembly (MEA) 33 is placed in the center of the cell frame 30. Manifold portions ML and MR are located on both sides of (or adjacent to both end portions of) the membrane electrode assembly 33 in the X direction, respectively.

The membrane electrode assembly 33 includes a solid polymer electrolyte membrane and paired electrodes sandwiching the electrolyte membrane.

The manifold portions ML and MR allow the hydrogen-containing gas and the oxygen-containing gas, as well as a cooling fluid, to flow in to the fuel cells 20 and out of the fuel cells 20, respectively. A diffuser region D through which the hydrogen-containing gas or the oxygen-containing gas flows is formed between the membrane electrode assembly 33 and the manifold portion ML and between the membrane electrode assembly 33 and the manifold portion MR. In this embodiment, the cooling fluid is, as an example, water.

The manifold portion ML, which is located on one side in the X direction, includes manifold holes M1 to M3 for supplying the oxygen-containing gas, the cooling fluid, and the hydrogen-containing gas, respectively. In the fuel cell stack A, the manifold holes M1 to M3 form three flow channels continuous in the stacking direction Z.

The manifold portion MR, which is located on the other side in the X direction, includes manifold holes M4 to M6 for discharging the oxygen-containing gas, the cooling fluid, and the hydrogen-containing gas, respectively. In the fuel cell stack A, the manifold holes M4 to M6 form three flow channels continuous in the stacking direction Z. Note that some or all of the supplying flow channels and the discharging flow channels may be reversed in position.

The diffuser region D is formed between the cell frame 30 and each of the separators 40 and 41, i.e., on each side of the cell frame 30. Although not shown, multiple protrusions of truncated cone shape are formed in each diffuser region D at predetermined intervals. These protrusions are located between the cell frame 30 and the separator 40 or 41 to separate them away from each other.

FIG. 2(A) is plan views each showing one of the faces of the anode-side separator 40, the cathode-side separator 41, the membrane electrode assembly 33 and its cell frame 30, or the seal plate P1. FIG. 2(B) is plan views showing the other face of each member shown in FIG. 2(A), turned around about its short axis. The members shown in FIG. 2(A) are stacked sequentially such that the face of the seal plate P1 shown at the bottom appears on the top. Also, the members shown in FIG. 2(B) are stacked sequentially such that the face of the anode-side separator 40 shown at the top appears on the top.

As shown in FIGS. 2(A) to 3(A), an adhesive seal 80 is provided continuously on the entire outside edge portion of the cell frame 30 and around each of the manifold holes M1 to M6. On the cathode face of the cell frame 30 shown in FIG. 2(A), the adhesive seal 80 surrounds only the manifold holes M2 to M5 so that the manifold holes M1 and M6 for supplying and discharging the oxygen-containing gas, respectively, are open to allow the oxygen-containing gas to flow therefrom or thereinto.

On the anode face of the cell frame 30 shown in FIG. 2(B), the adhesive seal 80 surrounds only the manifold holes M1, M2, M5, and M6 so that the manifold holes M3 and M4 for supplying and discharging the hydrogen-containing gas, respectively, are open to allow the hydrogen-containing gas to flow therefrom or thereinto.

As shown in FIGS. 2(A), 2(B), and 3(B), the separators 40 and 41 are each formed by press-molding a metal plate, such as a stainless steel plate, into a rectangular shape can be placed inside of the flange portion 32 of the cell frame 30.

As shown in FIG. 3(B), the separator 41 (40) has an uneven portion in its center part facing the membrane electrode assembly 33. In the uneven portion, recessed portions (elongated recesses) 41a (40a) and projecting portions (elongated projections) 41b (40b) extend continuously in the X direction. The recessed portions 41a (40a) and projecting portions 41b (40b) are arranged alternately in the Y direction. Manifold holes M1 to M6 are formed in end portions, in the X direction, of each separator 40 or 41 to correspond to the manifold holes M1 to M6 of the cell frame 30, respectively. The hydrogen-containing gas flowing in the gas flow channels F1 from the manifold hole M3 for supplying the hydrogen-containing gas is divided in the diffuser region D located on the one side in the X direction, and the divided hydrogen-containing gas flows flow inside the recessed portions 40a formed in the anode-side separator 40 on its cell frame 30 side. Then, the divided hydrogen-containing gas flows merge at the diffuser region D on the other side in the X direction, and is discharged from the manifold hole M4 for discharging the hydrogen-containing gas. Meanwhile, the oxygen-containing gas flowing in the gas flow channels F2 from the manifold hole M1 for supplying the oxygen-containing gas is divided in the diffuser region D located on the one side in the X direction, and the divided oxygen-containing gas flows flow inside the recessed portions 40a formed in the cathode-side separator 41 on its cell frame 30 side. Then, the divided oxygen-containing gas flows merge at the diffuser region D on the other side in the X direction, and is discharged from the manifold hole M6 for discharging the oxygen-containing gas.

As in the cell frame 30, the adhesive seal 80 is provided continuously on the entire outside edge portion of each separator 40 or 41 and around each of its manifold holes M1 to M6. In order to allow an appropriate one of the oxygen-containing gas, the hydrogen-containing gas, and the cooling fluid to flow through a corresponding interlayer space, the adhesive seal 80 is not formed around corresponding ones of the manifold holes M1 to M6 which should be open to allow the appropriate gas or fluid to flow through the interlayer space, and surrounds rest of the manifold holes M1 to M6, as shown in FIGS. 2(A) and 2(B).

In the fuel cell stack A, flow channels F3 for the cooling fluid (called "cooling flow channels F3" below) are defined between the opposing separators 40 and 41 of the adjacent fuel cells 20. The recessed portions 40a and 41a formed in the face of the separator 40 and 41 on the cooling flow channels F3 side define part of the cooling flow channels F3, and the cooling fluid flows inside the recessed portions 40a and 41a. The cooling flow channels F3 are also formed in a space between two adjacent cell modules M, or more specifically, in a space where their outermost fuel cells 20 face and abut each other, the space being surrounded by the flange portions 32. The seal plate P1 according to the first embodiment of the present invention is interposed in this cooling flow channels F3 between the cell modules M. The projecting portions 40b and 41b formed in the face of the separator 40 and 41 on the cooling flow channels F3 side are in contact with the seal plate P1 at their top or ridge portions.

The seal plate P1 according to this embodiment is formed separately from the fuel cells 20. As shown in FIGS. 2(A), 2(B), and 4, the seal plate P1 includes a plate substrate 50 which has manifold portions ML and MR opened in respective end portions of the plate substrate 50 in the X direction. A pressure-drop adjustment portion B1 according to a first example is formed in the center portion of the plate substrate 50. The seal plate P1 has a diffuser region D1 between the manifold portion ML and the pressure-drop adjustment portion B1 (at a position facing the diffuser region D of the cell frame 30 on the one side in the X direction) and another diffuser region D1 between the manifold portion MR and the pressure-drop adjustment portion B1 (at a position facing the diffuser region D of the cell frame 30 on the other side in the X direction).

The plate substrate 50 is formed by molding a single conductive metal plate into a shape and size similar to that of the fuel cell 20 in a plan view. By forming the plate substrate 50 with a conductive metal plate, stable electrical conductivity can be obtained for a long period of time. The manifold portions ML and MR of the plate substrate 50 have manifold holes M1 to M6 corresponding to the manifold holes M1 to M6 of the cell frame 30 and the separators 40 and 41.

The seal plate P1 has the manifold holes M1 to M6 corresponding to the manifold holes M1 to M6 of the cell module M. Thus, when interposed between the cell modules M, the seal plate P1 allows the manifold holes M1 to M6 of one of the cell modules M to be continuous with those of the other cell module M so that continuous flow channels can be formed.

The seal plate P1 includes seal members 51 to 54 (first seal members) which are formed on peripheral portions of the manifold holes M1, M3, M4, and M6, respectively, to define manifold holes M1, M3, M4, and M6 from which the oxygen-containing gas or the hydrogen-containing gas flows. The seal members 51 to 54 on the peripheral portions of the manifold holes M1, M3, M4, and M6 are formed independently from one another. As a matter of course, the manifold holes M2 and M4 from which the cooling fluid flows have no seal member formed therearound and are thus open. In this embodiment, the cooling fluid flows inside the cooling flow channels F3 from the manifold hole M2 to the manifold hole M5. Since this direction from the manifold hole M2 to the manifold hole M5 is almost parallel to the X direction, the flow direction of the cooling fluid flowing from the manifold hole M2 to the manifold hole M5 is also referred to as the X direction herein.

As shown also in FIG. 5, the seal plate P1 has an outer periphery seal member 55 (a second seal member) along the outermost peripheral portion of the plate substrate 50 and further has a third seal member provided between the second seal member (55) and the first seal members (51 to 54). In this embodiment, the third seal member is an inner periphery seal member 56 formed inside of and in parallel with the outer periphery seal member 55 with a certain distance therebetween. In a more preferable embodiment, these seal members 51 to 56 may be formed with an electrically-insulating material. In FIG. 5, reference numeral 9 denotes an adhesive.

Being independent in terms of structure, the seal members 51 to 54 can have different designs (heights, widths, and shapes) from one another. Since different fluids flow through different sealed portions, the seal members deteriorate differently from one another depending on where they seal. The seal members 51 to 54 can be designed individually according to their deterioration environment. Thus, the reliability of the fuel cell stack A can be improved.

In the fuel cell stack A, as shown in FIG. 5, the adhesive 9 joining the fuel cells 20 together and the inner periphery seal member 56 (the third seal member) are arranged linearly in such a manner as to form a straight line extending in the stacking direction Z of the cell modules M. In the example shown in FIG. 5, the adhesive 9 joining the cell frame 30 to each of the separators 40 and 41 and the inner periphery seal member 56 (the third seal member) are also arranged linearly in such a manner as to form a straight line extending in the stacking direction Z.

The pressure-drop adjustment portion B1 has a function of reducing or adjusting the pressure drop of the cooling fluid flowing through the cooling flow channels F3. Specifically, in the pressure-drop adjustment portion B1, the pressure drop is reduced or adjusted by reducing or changing the cross section of each cooling flow channel F3 (i.e., the cross section of a portion constituting part of the wall of the cooling flow channel F3) (in other words, by increasing or changing the area of the cross section of the cooling flow channel F3) in the active area, near the active area, or in and near the active area.

The reduction in the cross section of the cooling flow channel F3 includes both reduction in the flow direction of the cooling fluid (the X direction in this embodiment) and reduction in a direction perpendicular to the flow direction (the Y direction in this embodiment). Herein, the "active area" is a region facing a power generation area of the fuel cell 20, i.e., the membrane electrode assembly 33.

The pressure-drop adjustment portion B1 is formed in the active area of the seal plate P1. The pressure-drop adjustment portion B1 includes: an upstream array 60 of slits and a downstream array 61 of slits, the slits being formed in parallel with a long-axis center line O1 of the plate substrate 50; and two slits 62 in parallel with a short-axis center line O2 perpendicular to the long-axis center line O1. The long-axis center line O1 is an imaginary line dividing the short sides of the plate substrate 50 (the sides in parallel with the Y direction) in half, and the short-axis center line O2 is an imaginary line dividing the long sides of the plate substrate 50 the sides in parallel with the X direction) in half.

The upstream array 60 of slits consists of eight slits 60a arranged upstream of the flow direction of the cooling fluid, and the slits 60a extend in parallel with the X direction and have the same length and width. The downstream array 61 of slits consists of eight slits 61a arranged downstream of the flow direction of the cooling fluid. The slits 61a, like the slits 60a, extend in parallel with the X direction and have the same length and width.

As described, the seal plate P1 includes the multiple manifold holes M1, M3, M4, and M6 from which the two kinds of power generation gases flow separately in and out to flow through the fuel cells 20. The seal members 50 to 54 are formed on the peripheral portions of the manifold holes M1, M3, M4, and M6, respectively, to provide sealing for the corresponding power generating gas flowing therethrough. The seal plate P1 also includes the pressure-drop adjustment portion B1 for reducing or adjusting the pressure drop of the cooling water flowing through the cooling flow channels F3.

Thus, the seal plate P1 and the fuel cell stack A using the seal plate P1 are capable of reducing or adjusting the pressure drop in the cooling flow channels F3 between the adjacent cell modules M. Moreover, if, for example, the fuel cell stack has the cooling flow channels between the adjacent fuel cells 20 as well, the seal plate P1 can reduce variations in the flow rate of the cooling fluid among all the cooling flow channels.

In addition, since the pressure-drop adjustment portion B1 has the multiple slits 60a and 61a in parallel with the flow direction of the cooling fluid (the X direction in this embodiment), the seal plate P1 can reduce or adjust the pressure drop in the cooling flow channels F3 even more effectively.

Moreover, in the fuel cell stack A having the seal plate P1 described above, the seal plate P1 can be easily removed from the cell modules M. Consequently, in the fuel cell stack A, only the seal plate P1 has to be replaced when the seal members 51 to 54 are deteriorated, which thus allows continued use of the fuel cells 20 and the cell module M.

In the fuel cell stack A, the seal plate P1 includes the outer periphery seal member 55 (the second seal member) formed along its outer peripheral portion to seal the spaces between the seal plate P1 and its adjacent fuel cells 20. This can reliably block entrance of rainwater and the like from outside.

In the fuel cell stack A, the seal plate P1 further includes the inner periphery seal member 56 (the third seal member) between the outer periphery seal member 55 (the second seal member) and the first seal members 51 to 54. This can not only block entrance of rainwater and the like from outside, but also reliably prevent leak of the cooling fluid flowing through the cooling flow channels F3.

The first to third seal members 51 to 56 are formed of members having an electric insulation property. Thereby, in addition to the above-described effects of waterproofing and leak prevention, electric insulation is achieved between the fuel cell 20 and the seal plate P1 in a region other than the power-generation area (the active area) to enhance electrical conductivity in the power-generation area.

Furthermore, in the fuel cell stack A, the adhesive 9 joining the fuel cells 20 together and the inner periphery seal member 56 (the third seal member) are arranged linearly in such a manner as to form a straight line extending in the stacking direction Z of the cell modules M. By their elastic action, the adhesive 9 and the inner periphery seal member 56 can absorb the displacement in the fuel cell stack A caused in the staking direction Z by, for example, swelling of the membrane electrode assembly 33. Accordingly, the surface pressure acting on each fuel cell 20 can be evened out. Moreover, when the adhesive 9 joining the cell frame 30 to each of the separators 40 and 41 and the inner periphery seal member 56 are also arranged linearly in such a manner as to form a straight line extending in the stacking direction Z as shown in FIG. 5, the displacement absorbing function described above can be enhanced even more.

With reference to FIGS. 6(A) to 9(B), another example of the fuel cell stack A described above is described in detail below.

FIG. 6(A) is an enlarged sectional view of a part around the seal member 51 formed continuously on the peripheral portion of the manifold hole M1 for supplying the oxygen-containing gas, and FIG. 6(B) is an enlarged sectional view of a part indicated by encircling line I in FIG. 6(A). The seal member 51 includes a seal base 51a having a horizontal rectangular shape in section, and a seal lip 51b protruding from the upper surface of the seal base 51a and having a triangular shape in section.

The seal member 51 provides sealing and is made of a known rubber material which is elastically deformable. The seal base 51a of the seal member 51 of this embodiment has a step structure in its lower half portion, and the seal member 51 covers one main surface (which is the upper surface in FIG. 6(B)) 50a of the plate substrate 50 near the manifold hole M1 as well as a sidewall surface 50b of the plate substrate 50. The seal lip 51b is located closer to the center of the manifold hole M1 (i.e., the right in FIGS. 6(A) and 6(B)) than the sidewall surface 50b of the plate substrate 50 is. In other words, the seal lip 51b is formed at a position displaced to a side of the plate substrate 50 where the manifold hole M1 is found.

The tip of the seal lip 51b of the seal member 51 thus configured is in contact with the cathode-side separator 41 of the fuel cell 20 adjacently above. Even when the anode-side separator 40 and the plate substrate 50, among the separators 40 and 41 and the plate substrate 50, are in direct contact with each other with no space therebetween as in the portion indicated by encircling line II in FIG. 6(A), the seal member 51 can have enough thickness at the portion attached to the plate substrate 50 as indicated by reference numeral 52a in FIG. 6(B).

The seal member 51 can seal not only the space between the cathode-side separator 41 and the plate substrate 50, but also the space between the anode-side separator 40 and the plate substrate 50. Accordingly, a single seal member 51 can seal spaces between the three members, the separators 40, 41 and the plate substrate 50, which can contribute to structural simplification and size reduction of the members.

If the seal member 51 is provided continuously over both surfaces of the plate substrate 50, a crack or tear is easily caused due to such factors as displacement of the separator 40 or 41 or the plate substrate 50. In this embodiment, however, the seal member 51 covers a portion of the plate substrate 50, from the main surface 50a to the sidewall surface 50b. In other words, the seal member 51 is provided only on one side of the plate substrate 50. This allows prevention of a crack or tear even when the separator 40 or 41 or the plate substrate 50 is displaced. Although the seal member 51 is described as an example in this embodiment, the same applies to the other seal members 52 to 54, as well.

FIG. 7(A) is a partially-enlarged sectional view, taken along line D-D in FIG. 4, of the fuel cell stack A. FIG. 7(B) is an enlarged sectional view of a part indicated by encircling line III in FIG. 7(A). Specifically, FIGS. 7(A) and 7(B) each show the peripheral portion of the plate substrate 50 that defines the manifold hole M3 for supplying the hydrogen-containing gas, and also show the seal member 52 formed along that peripheral portion.

The seal member 52 has a seal base 52a shaped as a horizontal rectangle in section and a seal lip 52b protruding from the lower surface of the seal base 52a and shaped as a triangular in section. Similar to the seal member 51, the seal member 52 provides sealing, and is made of, for example, a known rubber material which is elastically deformable.

The seal base 52a has a step structure in its upper half portion, and covers one main surface (which is the lower surface in FIG. 7(B)) 50c and a sidewall surface 50b of the plate substrate 50 defining the manifold hole M3. The seal lip 52b is located closer to the center of the manifold hole M3 (i.e., the left in FIGS. 7(A) and 7(B)) than the sidewall surface 50b of the plate substrate 50 is. In other words, the seal lip 52b is formed at a position displaced to a side of the plate substrate 50 where the manifold hole M3 is formed, away from the main surface of the plate substrate 50.

The tip of the seal lip 52b of the seal member 52 configured as above is in contact with the anode-side separator 40 of the fuel cell 20 adjacently below. Among the separators 40 and 41 and the plate substrate 50, the cathode-side separator 41 and the plate substrate 50 are in direct contact with each other with no space therebetween as in the portion indicated by encircling line III in FIG. 7(A). The seal member 52 can seal not only the space between the anode-side separator 40 and the plate substrate 50, but also the space between the cathode-side separator 41 and the plate substrate 50.

Accordingly, a single seal member 52 can seal spaces between the three members, the separators 40, 41 and the plate substrate 50, which can contribute to structural simplification and size reduction of the members. Moreover, like the seal member 51 shown in FIGS. 6(A) and 6(B), the seal member 52 allows prevention of a crack or tear even when the separator 40 or 41 or the plate substrate 50 is displaced.

The seal member 51 shown in FIGS. 6(A) and 6(B) and the seal member 52 shown in FIGS. 7(A) and 7(B) are arranged on the upper surface and the lower surface, respectively, of the plate substrate 50 in relative positions to each other. Specifically, the seal member 51 on the peripheral portion of the manifold hole M1 for supplying the oxygen-containing gas is formed on the upper surface of the plate substrate 50 with its seal lip 51b pointing up, while the seal member 52 on the peripheral portion of the manifold hole M3 for supplying the hydrogen-containing gas is formed on the lower surface of the plate substrate 50 with its seal lip 52b pointing down. Thus, the seal members 51 and 52 are arranged in relative positions to each other with respect to the long-axis center line O1 in parallel with the flow direction of the cooling medium (the X direction in this embodiment). This allows stable sealing.

When a single seal member is to seal three plates (two spaces), each manifold hole portion has a different combination of two members in direct contact with each other. This problem in the combinational difference can be solved by arranging the seal members 51 and 52 in relative positions to each other on the upper surface and on the lower surface, respectively, as described above. Thus, stable sealing can be achieved on both surfaces of the plate substrate 50. Further, since the gas flow channels and the seal members can have the same height, the seal members can be reduced in size, and the seal members can have enough height (thickness), which improves the reliability of the sealing performance.

FIG. 8(A) is a partially-enlarged sectional view, taken along line E-E in FIG. 4, of an area around a seal member, according to another example, formed continuously on the peripheral portion of the manifold hole, and FIG. 8(B) is an enlarged sectional view of a part indicated by encircling line IV in FIG. 8(A). Note that portions equivalent to those in the above embodiment are given the same reference numerals as those given to them, and are not described in detail again.

A peripheral portion 50d of the plate substrate 50 which defines the manifold hole M4 shown in FIGS. 8(A) and 8(B) is bent upward away from the surface of the plate substrate 50. The seal member 53 is formed endlessly (annularly) along the entire peripheral portion 50d of the plate substrate 50 defining the manifold hole M4.

The seal member 53 is made of a known, elastically deformable material, such as rubber, and has a seal base 53a shaped as a horizontal rectangle in section and a seal lip 53b protruding from the upper surface of the seal base 53a and shaped as a triangle in section. Like the seal members described above, the seal member 53 provides sealing.

An outer half portion of the seal base 53a is shaped to cover two main surfaces (upper and lower surfaces in FIGS. 8(A) and 8(B)) 50a and 50c and a sidewall surface 50b of the plate substrate 50 defining the manifold hole M4, and the seal member 53 is fixed to the plate substrate 50 in such a manner that the seal lip 53b is located closer to the center of the manifold hole M4 (to the right in FIGS. 8(A) and 8(B))

than the sidewall surface 50b of the plate substrate 50 is. In other words, the seal lip 53b is shifted to a side of the plate substrate 50 where the manifold hole M4 is formed.

Like the prior examples, the seal member 53 can seal spaces between the three members: the separators 40 and 41 and the plate substrate 50. In addition to this, the insulation property can be enhanced because the inner peripheral surface of the manifold hole M4 is covered entirely.

FIG. 9(A) is a partially-enlarged sectional view, taken along line C-C in FIG. 4, of an area around an inner periphery seal member according to another example. FIG. 9(B) is an enlarged sectional view of a part indicated by encircling line V in FIG. 9(A). Note that portions equivalent to those in the above embodiments are given the same reference numerals as those given to them, and are not described in detail again.

Recessed portions 50e for seal member are formed in the plate substrate 50 at portions on its upper and lower surfaces where inner periphery seal members 56a are to be placed. The depths of the recessed portions 50e are determined considering the heights of the inner periphery seal members 56a. The inner periphery seal members 56a are made of a known, elastically-deformable material, such as rubber, and each includes a seal base 56a shaped as a horizontal rectangle in section and a seal lip 56b protruding from the surface of the seal base 56a and shaped as a triangle in section.

Because the plate substrate 50 has the recessed portions 50e for seal member, the plate substrate 50 is partially reduced in thickness, allowing the inner periphery seal members 56a to be increased in thickness. Consequently, a seal member with high allowable compression (high shrinkage) can be adopted. Further, the compressibility of rubber forming the seal member can be reduced to allow the robust design of the seal member and to extend the life of the seal member.

The seal plate P1 including the seal members 51 to 56 is applied to the fuel cell stack A described above. Since the seal plate P1 can be easily removed from the cell module M, only the seal plate P1 has to be replaced upon deterioration of the seal members 51 to 56. Accordingly, such a seal plate P1 can contribute to continued use of the fuel cells 20 and the cell module M.

FIGS. 10 to 14 are plan views of seal plates according to second to fifth embodiments, respectively. Note that portions equivalent to those in the above embodiment are given the same reference numerals as those given to them, and are not described in detail again.

Second Embodiment

As shown in FIG. 10, a seal plate P2 according to the second embodiment of the present invention includes a pressure-drop adjustment portion B2 according to a second example. The pressure-drop adjustment portion B2 has: an upstream array 60A of slits and a downstream array 61A of slits, the slits being formed in parallel with the long-axis center line O1 of the plate substrate 50; and two slits 62 extending in parallel with the short-axis center line O2 of the plate substrate 50, which is perpendicular to the long-axis center line O1.

The upstream array 60A of slits consists of ten slits 60b arranged upstream of the flow direction of the cooling fluid. In this embodiment, five slits 60b are arranged on each side of the long-axis center line O1 with a predetermined distance W1 therebetween. Each slit 60b is narrower than the slit 60a described above. The slits 60b have the same length and width and arranged in parallel with each other.

The downstream array 61A of slits consists of ten slits 61b arranged downstream of the flow direction of the cooling fluid. Slits 61b have the same shape, size, and arrangement pattern as the slits 60b. In this embodiment, five slits 61b are arranged on each side of the long-axis center line O1 with the predetermined distance W1 therebetween.

The seal plate P2 thus configured is capable of reducing or adjusting the pressure drop in the cooling flow channels F3 between the adjacent cell modules M. Moreover, if, for example, the fuel cell stack has the cooling flow channels between the adjacent fuel cells 20 as well, the seal plate P2 can reduce variations in the flow rate of the cooling fluid among all the cooling flow channels.

Third Embodiment

As shown in FIG. 11, a seal plate P3 according to the third embodiment of the present invention has a pressure-drop adjustment portion B3 according to a third example. The pressure-drop adjustment portion B3 shown in FIG. 11 has: an upstream array 60B of slits and a downstream array 61B of slits, the slits being formed in parallel with the long-axis center line O1 of the plate substrate 50; and two slits 62 extending in parallel with the short-axis center line O2 of the plate substrate 50, which is perpendicular to the long-axis center line O1.

The upstream array 60B of slits consists of fifteen slits 60c arranged upstream of the flow direction of the cooling fluid. The slits 60c are arranged in parallel with each other at equal intervals in the Y direction. The downstream array 61B of slits consists of eight slits 61c arranged downstream of the flow direction of the cooling fluid. The slits 61c have the same shape and size as the slits 60c, and are arranged at intervals twice those of the slits 60c.

Similar to the prior embodiments, the seal plate P3 thus configured is capable of not only reducing or adjusting the pressure drop in the cooling flow channels F3 between the adjacent cell modules M, but also adjusting the pressure drop in the cooling flow channels F3 between their upstream and downstream. Moreover, if, for example, the fuel cell stack has the cooling flow channels between the adjacent fuel cells 20 as well, the seal plate P3 can reduce variations in the flow rate of the cooling fluid among all the cooling flow channels.

Fourth Embodiment

As shown in FIG. 12, a seal plate P4 according to the fourth embodiment of the present invention has a pressure-drop adjustment portion B4 according to a fourth example. The pressure-drop adjustment portion B4 has: an upstream array 60C of slits and a downstream array 61C of slits, the slits being formed in parallel with the long-axis center line O1 of the plate substrate 50; and two slits 62 extending in parallel with the short-axis center line O2 of the plate substrate 50, which is perpendicular to the long-axis center line O1.

The upstream array 60C of slits consists of eight slits 60d arranged upstream of the flow direction of the cooling fluid. The slits 60d are arranged in parallel with each other at equal intervals in the Y direction. The slits 60d have the same shape and size as the slits 60a described above. The downstream array 61C of slits consists of seven slits 61d arranged downstream of the flow direction of the cooling fluid. The slits 61d have the same shape and size as the slits 60d, and are arranged in parallel with each other at equal intervals in the Y direction such that each slit 61*d* is located between the adjacent slits 60*d* (in the Y direction) when seen in the X direction.

Similar to the prior embodiments, the seal plate P4 thus configured is capable of not only reducing or adjusting the pressure drop in the cooling flow channels F3 between the adjacent cell modules M, but also adjusting the pressure drop in the cooling flow channels F3 between their upstream and downstream. Moreover, if, for example, the fuel cell stack has the cooling flow channels between the adjacent fuel cells 20 as well, the seal plate P4 can reduce variations in the flow rate of the cooling fluid among all the cooling flow channels.

Fifth Embodiment

As shown in FIG. 13, a seal plate P5 according to the fifth embodiment of the present invention has a pressure-drop adjustment portion B5 according to a fifth example. The pressure-drop adjustment portion B5 in FIG. 13 has: an upstream array 60D of slits and a downstream array 61D of slits formed in parallel with the long-axis center line O1 of the plate substrate 50; and two slits 62 extending in parallel with the short-axis center line O2 of the plate substrate 50, which is perpendicular to the long-axis center line O1.

The upstream array 60D of slits consists of eight slits 60*e* to 60*h* and 60*e* to 60*h* arranged upstream of the flow direction of the cooling fluid. The slits 60*e* to 60*h* and 60*e* to 60*h* are arranged in parallel with each other at equal intervals in the Y direction. The slits 60*e* to 60*h* are arranged sequentially from both outer sides in the Y direction toward the center (the long-axis center line O1) in the Y direction, and the lengths of the slits 60*e* to 60*h* become smaller and smaller, the slit 60*e* being the longest and the slit 60*h* being the shortest. The downstream array 61D of slits consists of eight slits 60*e* to 60*h* and 60*e* to 60*h* arranged downstream of the flow direction of the cooling fluid, in parallel with each other at equal intervals in the Y direction.

Similar to the prior embodiments, the seal plate P5 thus configured is capable of reducing or adjusting the pressure drop in the cooling flow channels F3 between the adjacent cell modules M. Moreover, if, for example, the fuel cell stack has the cooling flow channels between the adjacent fuel cells 20 as well, the seal plate P5 can reduce variations in the flow rate of the cooling fluid among all the cooling flow channels.

FIG. 14 is a partially-enlarged sectional view, taken along line V-V in FIG. 4, showing the positional relation between the seal plate P1 and the separators 40 and 41. FIG. 15 is a partially-enlarged view of a section taken at an equivalent position to line V-V in FIG. 4, and shows an example where a plate substrate is thicker than that in FIG. 14. Note that portions equivalent to those in the above embodiments are given the same reference numerals as those given to them, and are not described in detail again.

The seal plate P1 and the separators 40 and 41 shown in FIG. 14 have the following positional relation. Specifically, each slit 60*a* of the plate substrate 50 is not in contact with and is not sandwiched by the projecting portions 40*b* and 41*b* of the separators 40 and 41, but faces the recessed portions 40*a* and 41*a*. When the slit 60*a* is narrower than an opening size (width) W2 of the recessed portions 40*a* and 41*a*, the recessed portions 40*a* and 41*a* are shifted in the in-plane direction (the lateral direction in FIG. 14). Thus, the position of the slit 60*a* in the recessed portions 40*a* and 41*a* can be adjusted to adjust how much the plate substrate 50 protrudes (namely, protruding lengths W3 and W4) to the inside of the recessed portions 40*a* and 41*a* (i.e., to the inside of the cooling flow channel F3).

By thus adjusting the protruding lengths W3 and W4 of the plate substrate 50 inside the recessed portions 40*a* and 41*a*, the pressure drop in the cooling flow channels F3 can be reduced or adjusted. Further, when the seal plate P1 and the separators 40 and 41 have the positional relation described above, the pressure drop can be adjusted by increasing a thickness T of the plate substrate, like the plate substrate 50' shown in FIG. 15.

FIGS. 16 and 17 are each a partially-enlarged view of a section taken at an equivalent position to line V-V in FIG. 4. In FIG. 16, the pitches of the slits 60*a* formed in the plate substrate 50 are each twice that of the recessed portions 40*a* and 41*a* and the projecting portions 40*b* and 41*b* of the separators 40 and 41. The width of each slit 60*a* is almost the same as the opening size W2 of the recessed portions 40*a* and 41*a*.

In FIG. 17, the pitches of the recessed portions 40*a* and 41*a* and the projecting portions 40*b* and 41*b* of the separators 40 and 41 are the same as that of the slits 60*a* formed in the plate substrate 50. The width of each slit 60*a* is the same as the opening size W2 of the recessed portions 40*a* and 41*a*.

In the configurations shown in FIGS. 16 and 17, portions of the plate substrate 50 at which no slit 60*a* is formed are sandwiched by the projecting portions 40*b* and 41*b* of the paired separators 40*a* and 41. Thus, without interfering with the conductive property, partial decrease in the surface pressure can be prevented, and deformation is not caused in the separators 40 and 41 and the like.

FIGS. 18 and 19 are plan views of seal plates P6 and P7 according to sixth and seventh embodiments of the present invention, respectively. Note that portions equivalent to those in the above embodiments are given the same reference numerals as those given to them, and are not described in detail again.

Sixth Embodiment

The seal plate P6 according to the sixth embodiment of the present invention has pressure-drop adjustment portions B6 according to a sixth example. The pressure-drop adjustment portions B6 shown in FIG. 18 each have a function of reducing or adjusting the pressure drop of the cooling water flowing through the cooling flowing channels F3. Specifically, in the pressure-drop adjustment portions B6, the pressure drop is reduced or adjusted by reducing or changing the cross section of each cooling flow channel F3 (i.e., the cross section of a portion constituting part of the wall of the cooling flow channel F3) (in other words, by increasing or changing the cross-sectional flow channel F3 (i.e., the cross section of a portion constituting part of the wall of the cooling flow channel F3) (in other words, by increasing or changing the cross-sectional area of the cooling flow channel F3) in a region near the active area.

The pressure-drop adjustment portions B6 are arranged in the respective diffuser regions D1 of the seal plate P6 (which respectively face the diffuser regions D of the cell frame 30, one located on one side and the other one on the other side in the X direction of the cell frame 30). The pressure-drop adjustment portions B6 are each formed as an opening whose area, in a plan view, increases away from the long-axis center line O1 toward the ends of the seal plate P6 in its short-side direction (the opening being called an opening B6 below). Specifically, the opening width of the opening B6 in the X direction increases from the center in the Y direction toward the outer sides in the Y direction. The opening B6 is defined by a long side 70a in parallel with the short-axis center line O2, short sides 70b in parallel with the long-axis center line O1, and a long side 70c whose center in the Y direction (on the long-axis center line O1) protrudes relative to its outer ends in the Y direction toward the inside of the opening to form a curved line (in other words, the long side 70c is curved such that its center in the Y direction is located on the outer side in the X direction).

In the seal plate P6 thus configured, the openings B6 (slits) are formed in the diffuser regions D1. The openings B6 are each formed into a shape whose opening area gradually increases away from the center of the cooling fluid flowing region in the direction perpendicular to the flowing direction of the cooling fluid.

Thus, similar to the prior embodiments, the seal plate P6 is capable of reducing or adjusting the pressure drop in the cooling flow channels F3 between the adjacent cell modules M. In particular, the length of the slit measured in the flow direction of the cooling fluid (the X direction in this embodiment) can be small at the center and large at the end portions (outer sides in the Y direction) of the plate substrate 50 in the width direction of the plate substrate 50 (the Y direction in this embodiment). Thus, the pressure drop between the channels can be adjusted (or, for example, the variations in the pressure drop can be reduced). Moreover, if, for example, the fuel cell stack has the cooling flow channels between the adjacent fuel cells 20 as well, the seal plate P6 can reduce variations in the flow rate of the cooling fluid among all the cooling flow channels.

Seventh Embodiment

The seal plate P7 according to the seventh embodiment of the present invention has pressure-drop adjustment portions B7 according to a seventh example. The pressure-drop adjustment portions B7 are arranged in the seal plate P7 near the active area, or in this embodiment, in the respective diffuser regions D1. The pressure-drop adjustment portions B7 are each formed as an opening whose area, in a plan view, increases away from the long-axis center line O1 toward the ends of the seal plate P7 in its short-side direction (the opening being called an opening B7 below). Specifically, the opening width of the opening B7 in the X direction increases from the center in the Y direction toward the outer sides in the Y direction. The opening B7 is defined by a long side 70a in parallel with the short-axis center line O2, short sides 70b in parallel with the long-axis center line O1, and a long side 70c whose center in the Y direction (on the long-axis center line O1) protrudes relative to its outer ends in the Y direction toward the inside of the opening to form a curved line (in other words, the long side 70c is curved such that its center in the Y direction is located on the outer side in the X direction). A connected piece 70d is provided on the long-axis center line O1 between the Y-direction center portions of the long sides 70a and 70c to connect the long sides 70a and 70c to each other.

In the seal plate P7 thus configured, the openings B7 (slits) are formed in the diffuser regions D1, and they are each formed into a shape whose opening area gradually increases away from the center of the cooling fluid flowing region in the direction perpendicular to the flowing direction of the cooling fluid.

Thus, similar to the prior embodiments, the seal plate P7 is capable of reducing or adjusting the pressure drop in the cooling flow channels F3 between the adjacent cell modules M. In particular, the length of the slit measured in the flow direction of the cooling fluid (the X direction in this embodiment) can be small at the center and large at the end portions (outer sides in the Y direction) of the plate substrate 50 in the width direction of the plate substrate 50 (the Y direction in this embodiment). Thus, the pressure drop between the channels can be adjusted. In addition, the connected piece 70d located coinciding with the long-axis center line O1 acts as a reinforcement portion to prevent deformation of the seal plate P7, while still allowing the pressure-drop reduction or adjustment function to be achieved. Moreover, if, for example, the fuel cell stack has the cooling flow channels between the adjacent fuel cells 20 as well, the seal plate P7 can reduce variations in the flow rate of the cooling fluid among all the cooling flow channels.

Eighth Embodiment

FIG. 20 is a view illustrating a seal plate P8 according to an eighth embodiment of the present invention, and FIG. 21 is an enlarged plan view of an end portion of the seal plate P8 shown in FIG. 20. Note that portions equivalent to those in the above embodiments are given the same reference numerals as those given to them, and are not described in detail again.

The seal plate P8 according to the eighth embodiment of the present invention has pressure-drop adjustment portions B8. The pressure-drop adjustment portions B8 have a function of reducing or adjusting the pressure drop of the cooling water flowing through the cooling flow channels F3. Specifically, in the pressure-drop adjustment portion B1, the pressure drop is reduced or adjusted by reducing or changing the cross section of each cooling flow channel F3 (i.e., the cross section of a portion constituting part of the wall of the cooling flow channel F3) (in other words, by increasing or changing the cross-sectional area of the cooling flow channel F3) in the active area, near the active area, or in and near the active area. The reduction in the cross section of the cooling flow channels includes both reduction in the flow direction of the cooling fluid (the X direction in this embodiment) and reduction in the direction perpendicular to the flow direction (the X direction in this embodiment).

The pressure-drop adjustment portions B8 are arranged in the respective diffuser regions D near the active area. As shown in FIG. 21, each pressure-drop adjustment portion B8 has an opening portion 71 for reduction or adjustment of the pressure drop of the cooling water flowing through the cooling flow channels F3 formed between the cell modules M. The opening portion 71 has a long connected piece 71c and a short connected piece 71d for reinforcement, bridging thereover in a direction (the Y direction in this embodiment) intersecting the flowing direction of the cooling fluid (the X direction in this embodiment).

To be more specific, the opening portion 71 has a portion projecting in the opposite direction to the flow direction X. The opening portion 71 includes a large opening portion 71a shaped as a long rectangle extending in parallel with the short-axis center line O2 and a small opening portion 71b located on the long-axis center line O1. The opening portion 71 also has the long connected piece 71c bridging over the large opening portion 71a between its short sides, at a position somewhat shifted toward the short-axis center line O2. The long connected piece 71c subdivides the large opening portion 71a to form a slit 62 extending along the short-axis center line O2. The opening portion 71 also includes the short connected piece 71*d* bridging over the intermediate portion, in the X direction, of the small opening portion 71*b*.

The short connected piece 71*d* is located at a position facing a seal portion 80*a* of the adhesive seal 80 provided on the cell frame 30. The seal portion 80*a* can thus be pressed by the short connected piece 71*d*. The long connected piece 71*c* is located at a position facing the diffuser region D of the cell frame 30. Thus, the long and short connected pieces 71*c* and 71*d* function to suppress deformation of the diffuser regions D of the cell frame 30.

In the seal plate P8 described above, the seal member (80) is provided on each of the separators constituting the fuel cell 20 (only the adhesive seal is shown in FIG. 21), and the slits 62 are formed in portions where no seal member (80) is provided.

Thus, similar to the prior embodiments, the seal plate P8 is capable of reducing or adjusting the pressure drop in the cooling flow channels F3 between the adjacent cell modules M. Moreover, if, for example, the fuel cell stack has the cooling flow channels between the adjacent fuel cells 20 as well, the seal plate P8 can reduce variations in the flow rate of the cooling fluid among all the cooling flow channels.

Moreover, in the seal plate P8, the short connected piece 71*d* is formed at a position where the seal portion 80*a* is to be provided in the Y direction. The slit 62 is formed in an area where no seal member (80) is to be provided. Thus, even when the gas pressure becomes greater than the cooling water pressure, so that the differential pressure between them acts on the seal member 80, the differential pressure does not act as a force in the peeling direction of the seal member 80 if the seal member 80 is an adhesive seal or as a force in a direction of decreasing the shrinkage (allowable compression) of the seal member 80 if the seal member 80 is a compression seal. Thereby, the reliability and durability of the seal member 80 can be improved.

In the fuel cell stack A, the seal plate P8 has the opening portions 71 for reducing or adjusting the pressure drop of the cooling water flowing through the cooling flow channels F3 formed between the cell modules M. Each opening portion 71 has the long and short reinforcement connected pieces 71*c* and 71*d* bridging thereover in the direction (the Y direction in this embodiment) intersecting the flowing direction of the cooling fluid (the X direction in this embodiment). Thus, the seal plate P8 can achieve its pressure-drop adjustment function with the opening portions 71, and at the same time, can suppress deformation of the cell frame 30 at its diffuser regions D.

The pressure drop of the fuel cell stack A can be adjusted as described above by the opening portions 71 provided in each seal plate P8. However, depending on the operation mode, such as at the time of activation, the fuel cell stack A is operated with the power-generation gases intentionally increased or decreased. In this event, the seal plate P8 and the cell frame 30 sometimes deform in their thickness direction, and also, the flow rates of the power-generation gases and/or the cooling fluid might become unsteady to cause pulsation. To deal with this, the reinforcement connected pieces 71*c* and 71*d* are provided to each opening portion 71 of the seal plate P8 to, irrespective of the operation mode, prevent deformation of the seal plate P8 and the cell frame 30 and stabilize the capacities of the cooling flow channels F3. Thus, the flow rate of the cooling fluid becomes steady, and favorable cooling function and power-generation function can be maintained.

Ninth Embodiment

FIG. 22(A) is a plan view showing a seal plate P9 according to a ninth embodiment of the present invention, and FIG. 22(B) is a partially-enlarged sectional view of a section taken along line VII-VII in FIG. 22(A). Note that portions equivalent to those in the above embodiments are given the same reference numerals as those given to them, and are not described in detail again.

The seal plate P9 according to the ninth embodiment of the present invention shown in FIGS. 22(A) and 22(B) has a pressure-drop adjustment portion B9 according to a ninth example. The pressure-drop adjustment portion B9 has: an upstream array 60E of grooves and a downstream array 61E of grooves, the grooves being formed in parallel with the long-axis center line O1 of the plate substrate 50; and two slits 62 extending in parallel with the short-axis center line O2 perpendicular to the long-axis center line O1.

The upstream groove group 60E consists of eight grooves 60*i* arranged upstream of the flow direction of the cooling fluid. In this embodiment, four grooves 60*i* are arranged on each side of the long-axis center line O1 with a predetermined distance W1 therebetween. The grooves 60*i* are formed by decreasing, by a predetermined amount, the thickness of the plate substrate 50 at its opposite portions on the upper and lower surfaces, respectively, through etching or drawing. The grooves 60*i* have almost the same width as the slits 60*a*. The grooves 60*i* have the same length and formed in parallel with each other at equal intervals.

The downstream array 61E of grooves consists of eight grooves 61*j* arranged downstream of the flow direction of the cooling fluid. The grooves 60*j* have the same shape, size, and arrangement pattern as the grooves 60*i*.

Similar to the seal plates having the through-slits, the seal plate P9 described above, which has the multiple grooves 60*i* and 61*i* in parallel with the flow direction of the cooling fluid, is capable of reducing or adjusting the pressure drop in the cooling flow channels F3 between the adjacent cell modules M. The pressure drop can be reduced or adjusted through adjustment of the depths of the grooves 60*i* and 60*j*, as well. Moreover, if, for example, the fuel cell stack has the cooling flow channels between the adjacent fuel cells 20 as well, the seal plate P9 can reduce variations in the flow rate of the cooling fluid among all the cooling flow channels.

When applied to the fuel cell stack A, any of the seal plates P1 to P9 can provide the following effects. Specifically, the seal plate can be easily removed from the cell module M. Accordingly, when the seal members 51 to 56 of a certain seal plate is deteriorated, only that seal plate has to be replaced, allowing continued use of the cell module M. Moreover, when a certain cell module M is broken, only that cell module M has to be replaced, which allows continued use of the seal plate.

Further, when the seal plate is interposed in a certain layer of the cooling flow channels F3 in the fuel cell stack A, the seal plate can make the pressure drop (the cooling water flow rate) be matched between those cooling flow channels F3 and the cooling flow channels F3 of another layer. Furthermore, variations in the cooling fluid flow rate between the fuel cell 20 at the end of the cell module M and the fuel cell 20 in the center of the cell module M can be reduced. Note that the configuration of the pressure-drop adjustment portion can be any appropriate combination of the embodiments given above, which is determined according to the various conditions of the fuel cell stack and the seal plate.

Although the space defined between the adjacent cell modules M is the flow channels for the cooling medium in the embodiments above, the seal plate can be interposed also when that space is not used as the flow channels.

Tenth Embodiment

FIG. 23 is a view illustrating a fuel cell stack A according to a tenth embodiment of the present invention. FIG. 24(A)

is a plan view of the cell module M shown in FIG. 23, and FIG. 24(B) is a perspective view of the fuel cell stack A. Note that only the seal members of a seal plate (not shown) is superimposed on the cell module M in FIG. 24(A) in order to show the seal members. Note that the same constituents as those in the prior embodiments are given the same reference numerals as those given to them, and are not described in detail again.

In the fuel cell stack A shown in FIG. 24(A), in order to allow voltage measurement of each fuel cell 20, one of the paired separators (the cathode-side separator 41 in the example in FIG. 24) has an extension 41E formed at part of the outer peripheral portion of the separator 41 and a voltage measurement tab 41T protruding continuously from the extension 41E to the outside of the fuel cell stack A.

As shown in FIG. 23, an insulating adhesive seal portion 90 is provided between the extension 41E and the cell frame 30 of the fuel cell 20 and between the extension 41E and the cell frames 30 of the adjacent fuel cell 20 to provide sealing in those spaces. This prevents a short circuit between the separators 41 and entrance of rainwater and the like from outside. In addition, the voltage measurement tabs 41T are provided at the same position in their fuel cells 20 so as to be arranged linearly in a straight line extending along the stacking direction Z as shown in FIG. 24(B). A connector (not shown) is attached to the line of the voltage measurement tabs 41T thus arranged in a line.

In the fuel cell stack A, a connector seal member 57 is provided at least on each side of (the line of) the voltage measurement tabs 41T. The connector seal member 57 is a film-like member continuously extending at least over the cell module M in the cell stacking direction Z. In the example shown in FIGS. 23 to 24(B), the connector seal member 57 is in contact with the outer periphery seal member 55 of the seal plate P1, at its one end in the stacking direction Z (which is the lower end in FIG. 23 and the upper end in FIG. 24(B)) and is continuous therewith. The connector seal member 57 is a separate member from the outer periphery seal member 55.

When the cell modules M and the seal plates P1 are alternately stacked to form the fuel cell stack A, the connector seal member 57 of one cell module M comes into contact, at its other end in the cell stacking direction (the upper end in FIG. 23 and the lower end in FIG. 24(B)), with another connector seal member 57 of the adjacent cell module M and thus becomes continuous therewith. Thus, the connector members 57 of the respective cell modules M become continuous in the stacking direction Z.

In the fuel cell stack A thus configured, one of the paired separators 40 and 41 of each fuel cell 20 has the voltage measurement tab 41T projecting outside of the cell module M, and the voltage measurement tabs 41T are arranged linearly in a straight line in the cell stacking direction Z. Further, the connector seal member 57 is provided at least on each side of the line of the voltage measurement tabs 41T. Thus, similar to the prior embodiments, even when the seal members 51 to 57 are deteriorated, only the seal plate P1 has to be replaced to allow continued use of the cell module M. In addition to this, an improvement can be achieved for the waterproofing around the voltage measurement tabs 41T protruding outward of the fuel cell stack A.

Since the connector seal members 57 in the fuel cell stack A are film-like members extending continuously in the cell stacking direction Z, they can easily come into tight contact with the connector connected to the measurement tabs 41T, enabling improved waterproofing at their connection portions.

The connector seal members 57 in the fuel cell stack A are separate members from the outer periphery members 55 of the seal plates P1 and are continuous. This allows, not only the improvement in waterproofing described above, but also removal of only the seal plates P1 or even only the connector seal members 57.

Note that it is also possible to make the connector seal members 57 have an integral structure extending over multiple cell modules M or over the entire fuel cell stack A, or be integral with the outer periphery seal members 55, or be brought to an integral structure by being connected together after assembly of the fuel cell stack A.

Although the embodiments of the present invention have been described, the embodiments have been provided only to give examples for an easy understanding of the present invention, and the present invention is not limited to the foregoing embodiments. The technical scope of the present invention includes not only the technical matters specifically disclosed in the above embodiments, but also various modifications, changes, and alternative techniques that may be easily conceived of therefrom. For example, although the cell modules M have the same number of stacked fuel cells 20 as each other in the embodiments above, each cell module M may have a different number of stacked fuel cells 20.

Although the seal plates are formed of an electrically-conductive metal material in the above embodiments, at least their active areas may have to be formed of an electrically-conductive material. The seal plates are generally subjected to a surface treatment in order to obtain electrical conductivity which is stable over time. However, only the active areas may have to be subjected to the surface treatment. Thus, process efficiency can be achieved. In addition, carbon may be used as the material for the active areas, in which case the surface treatment is unnecessary.

Although the pressure-drop adjustment portions of the above embodiments have either slits or grooves, they may have both slits and grooves.

The present application claims priority from Japanese Patent Application No. P2012-053314 filed on Mar. 9, 2012 and Japanese Patent Application No. P2012-275474 filed on Dec. 18, 2012, the entire contents of which are incorporated herein by reference.

INDUSTRIAL APPLICABILITY

According to the present invention, in the fuel cell stack, the pressure drop in the cooling flow channels formed between the cell modules can be reduced or adjusted.

REFERENCE SIGNS LIST 20 fuel cell
40, 41 separator
40a, 41a recessed portion
40b, 41b projecting portions
41T voltage measurement tab
51 to 54 seal members
55 outer periphery seal member
57 connector seal member
62 slit
60i, 61i groove
80 adhesive seal (seal member)
A fuel cell stack
B1 to B9 pressure-drop adjustment portions
D diffuser region
F3 cooling flow channel M cell module
M1 to M6 manifold holes
P1 to P9 seal plates

The invention claimed is:

1. A fuel cell stack comprising:
at least two cell modules adjacent to each other, the at least two cell modules each being formed by stacking a plurality of fuel cells into an integrated unit; and
a cooling flow channel defined between a first separator of one of the at least two cell modules and a second separator of another of the at least two cell modules, the cooling flow channel configured to allow a cooling fluid to flow therethrough; and
a seal plate interposed in the cooling flow channel,
wherein the seal plate comprises:
   a conductive metal plate;
   a manifold portion in which a plurality of manifold holes are formed to allow two power-generation gases to flow separately through the plurality of manifold holes and through the plurality of fuel cells;
   a seal member provided along a peripheral portion of each of the plurality of manifold holes to provide sealing between the cooling fluid and a corresponding one of the two power-generation gases flowing through the manifold hole;
   cooling manifold holes for the cooling fluid; and
   a pressure-drop adjustment portion configured to reduce or adjust a pressure drop of the cooling fluid flowing through the cooling flow channels by reducing or changing the cross section area of each cooling flow channel, and
wherein the pressure-drop adjustment portion is provided as slits or openings formed on the seal plate.

2. The fuel cell stack according to claim 1, wherein the pressure-drop adjustment portion comprises a plurality of slits extending parallel to a flow direction of the cooling fluid.

3. The fuel cell stack according to claim 1, wherein in a separator constituting part of each of the plurality of fuel cells, recessed portions through which the cooling fluid flows and projecting portions contacting the seal plate are alternately formed, and the pressure-drop adjustment portion comprises a plurality of slits at positions facing the recessed portions.

4. The fuel cell stack according to claim 1, wherein:
a slit is formed in a diffuser region of the seal plate, and
the slit is formed into a shape having an opening area that gradually increases away from a center of a cooling fluid flowing region in a direction perpendicular to a flow direction of the cooling fluid.

5. The fuel cell stack according to claim 1, wherein the pressure-drop adjustment portion has a plurality of grooves extending in parallel with a flow direction of the cooling fluid.

6. The fuel cell stack according to claim 1, wherein:
a seal member is provided on a separator of each of the plurality of fuel cells, and
a slit is formed in a portion of the seal plate not facing the seal member provided on the separator.

7. The fuel cell stack according to claim 1, wherein:
one of paired separators of each of the plurality of fuel cells has a plurality of voltage measurement tabs projecting toward an outside of the cell modules, the plurality of voltage measurement tabs arranged to form a line extending in a cell stacking direction, and
a connector seal member is provided at least on each side of the line of the plurality of voltage measurement tabs.

8. The fuel cell stack according to claim 7, wherein the connector seal member is a film-like member continuous in the cell stacking direction.

9. The fuel cell stack according to claim 8, wherein:
the seal plate comprises an outer periphery seal member formed along an outer peripheral portion of the seal plate to seal a space between the seal plate and adjacent ones of the plurality of fuel cells, and
the connector seal member is a seal.

10. A fuel cell stack comprising:
at least two cell modules adjacent to each other, the at least two cell modules each being formed by stacking a plurality of fuel cells into an integrated unit;
a cooling flow channel defined between a first separator of one of the at least two cell modules and a second separator of another of the at least two cell modules, the cooling flow channel configured to allow a cooling fluid to flow therethrough; and
a seal plate interposed in the cooling flow channel,
wherein the seal plate comprises:
   a conductive metal plate;
   a manifold portion in which a plurality of manifold holes are formed to allow two power-generation gases to flow separately through the plurality of manifold holes and through the plurality of fuel cells;
   a seal member provided along a peripheral portion of each of the plurality of manifold holes to provide sealing between the cooling fluid and a corresponding one of the two power-generation gases flowing through the manifold hole;
   cooling manifold holes for the cooling fluid; and
   a pressure-drop adjustment portion provided as slits or openings formed on the conductive metal plate and configured to reduce or adjust a pressure drop of the cooling fluid flowing through the cooling flow channels by reducing or changing the cross section area of each cooling flow channel.

* * * * *